(12) United States Patent
Raducha et al.

(10) Patent No.: US 6,915,863 B2
(45) Date of Patent: Jul. 12, 2005

(54) PLANTER BAR SUPPORT WHEEL ASSEMBLY

(75) Inventors: Kregg J. Raducha, Chicago, IL (US); Geoffrey E. Cherry, Chicago, IL (US)

(73) Assignee: CNH America LLC, Racine, WI (US)

(*) Notice: Subject to any disclaimer, the term of this patent is extended or adjusted under 35 U.S.C. 154(b) by 3 days.

(21) Appl. No.: 10/751,701

(22) Filed: Jan. 5, 2004

(65) Prior Publication Data

US 2004/0149190 A1 Aug. 5, 2004

Related U.S. Application Data

(62) Division of application No. 10/090,273, filed on Mar. 4, 2002, now Pat. No. 6,681,866.

(51) Int. Cl.[7] .............................................. A01B 63/00
(52) U.S. Cl. ........................ 172/452; 172/311; 111/59
(58) Field of Search .............................. 172/452, 311, 172/456, 776; 111/57, 55, 59, 66, 62; D15/10

(56) References Cited

U.S. PATENT DOCUMENTS

| | | | | |
|---|---|---|---|---|
| 4,677,922 A | * | 7/1987 | Shrull et al. .................. | 111/52 |
| 4,869,327 A | * | 9/1989 | Korf .......................... | 172/211 |
| 5,113,956 A | | 5/1992 | Friesen et al. .............. | 172/311 |
| 5,267,618 A | * | 12/1993 | Harrell ....................... | 172/219 |
| 5,400,859 A | * | 3/1995 | Harrell ....................... | 172/219 |
| 6,213,034 B1 | | 4/2001 | Raducha et al. ............. | 111/57 |
| 6,273,449 B1 | | 8/2001 | Harkcom et al. ........ | 280/491.3 |
| D469,782 S | * | 2/2003 | Paluch et al. ................ | D15/10 |
| 6,550,543 B1 | * | 4/2003 | Friggstad .................... | 172/311 |
| 6,666,155 B2 | * | 12/2003 | Paluch et al. ................. | 111/54 |
| 6,681,866 B1 | * | 1/2004 | Raducha et al. ............ | 172/452 |
| 6,691,629 B2 | * | 2/2004 | Paluch et al. ................. | 111/56 |
| 6,691,794 B2 | * | 2/2004 | Paluch et al. ............... | 172/679 |

* cited by examiner

*Primary Examiner*—Victor Batson
(74) *Attorney, Agent, or Firm*—Rebecca Henkel; Brant T. Maurer

(57) ABSTRACT

An agricultural apparatus comprising a carrier frame including a support surface defining an arcuate track about a pivot point, a mainframe mounted to the carrier frame at the pivot point for rotation thereabout between an operating position and a transportation position and a wheel assembly including at least one wheel mounted to a mounting member, the mounting member mounted to the mainframe such that the wheel is received on the curved track for rotation there along where the wheel assembly is vertically adjustable.

9 Claims, 29 Drawing Sheets

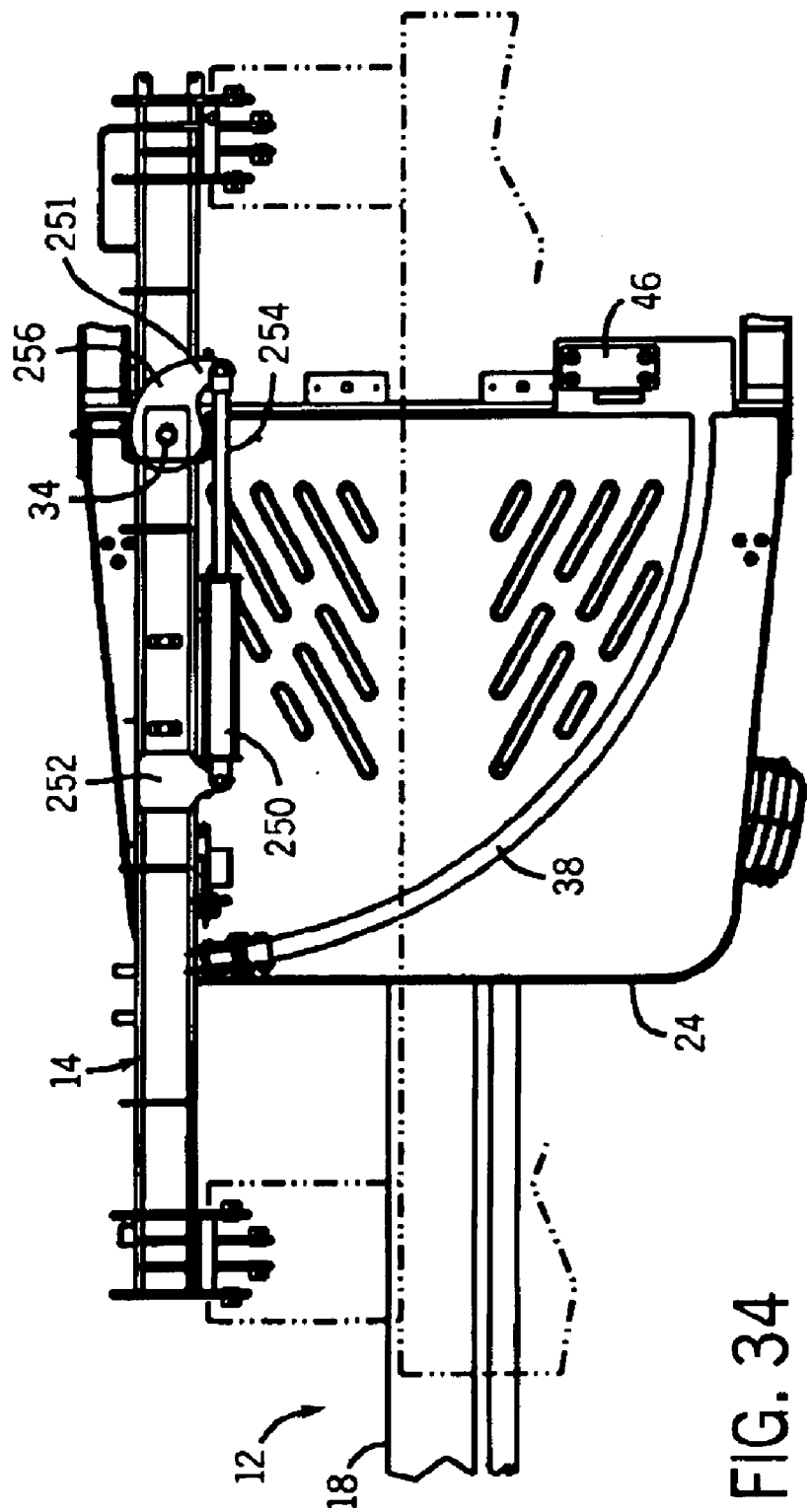

PLANTER BAR SUPPORT WHEEL ASSEMBLY

CROSS-REFERENCE TO RELATED APPLICATIONS

This is a divisional of application Ser. No. 10/090,273, filed on Mar. 4, 2002, now U.S. Pat. No. 6,681,866.

FIELD OF THE INVENTION

The present invention relates generally to agricultural equipment and more specifically to an extendable multi-stage hitch assembly for linking an agricultural implement to a prime mover.

BACKGROUND OF THE INVENTION

Various types of agricultural implements have been developed that can be linked via an implement tongue member to a tractor hitch or other type of prime mover to facilitate different tasks including, for example, seeding, fertilizing and tilling. While there are many different factors that have to be considered when assessing the value of a particular implement, one relatively important factor is how quickly the implement can accomplish the task that the implement has been designed to facilitate. One way to increase task speed has been to increase implement width thereby reducing the number of passes required to perform the implement's task for an entire field. Thus, for instance, doubling the width of a seeding implement generally reduces the time required to completely seed a field by half.

With the development of modern high-powered tractors and implements, many implements extend to operating field widths of 40 feet or more. Hereinafter when an implement is extended into an operating configurations to accomplished specific tasks (e.g., seeding, tilling, etc.), the implement will be said to be in an operating position and have an operating width.

Unfortunately, while expansive implement operating widths are advantageous for quickly accomplishing tasks, such expansive widths cannot be tolerated during implement transport and storage. With respect to transport, egresses to many fields are simply not large enough to accommodate transport of a 40 plus foot implement into and out of the fields. In addition, often buildings and fences obstruct passageways and therefore will not allow transport. Moreover, many farm fields are separated by several miles and farmers have to use commercial roadways to transport their implements to and from fields. Essentially all commercial roadways are not designed to facilitate wide implement transport.

Recognizing the need for expansive implement operating widths and relatively narrow transport widths, the industry has developed some solutions that facilitate both transport and operating widths. To this end, one solution has been to provide piece-meal implements that can be disassembled into separate sections and stacked on a wheel supported implement section or on a separate trailer for transport. Obviously this solution is disadvantageous as it requires excessive labor to assemble and disassemble the implements between transport and intended use and may also require additional equipment (e.g., an additional trailer).

Another solution has been to provide a folding implement configuration. For instance, in a "scissors type" configuration, where an implement chassis is supported by wheels, right and left implement bars are pivotally mounted to the chassis where each bar is moveable between an operating position extending laterally from the chassis and a transport position where the bar is forwardly swingable over the tongue member and supportable by the tongue member during transport. As another instance, "pivotal-type" configurations provide a single implement bar centrally mounted for pivotal movement on a wheel supported chassis where the single bar is pivotable about the mount so that half of the bar extends over the tongue member and is supportable thereby and the other half of the bar extends away from the tractor behind the chassis. One exemplary pivotable configuration is described in U.S. Pat. No. 6,213,034 (hereinafter "the '034 patent) which issued on Apr. 10, 2001 and is entitled "Planter Apparatus and Method".

In either of the scissors or pivotal configurations, the tongue member has to be long enough to accommodate half the implement bar length plus some clearance required to allow a tractor linked to the tongue member to turn left and right. Thus, for instance, where the implement operating width is 40 feet, the tongue member generally has to be greater than 20 feet long.

While task speed is one important criteria with which to judge implement value, one other important criteria is implement effectiveness and efficiency. In agricultural endeavors, perhaps the most important measure of effectiveness is yield per acre. For this reason, when seeding a field, a farmer wants to seed every possible square foot of the field and thereafter, when maintaining (i.e., tilling, fertilizing, etc.) and harvesting a field, the farmer wants to avoid destroying the plants in the field. To maximize field seeding, farmers typically travel along optimal field paths. For instance, to ensure that seed is planted along the entire edge of a field, a farmer typically starts seeding the field by first traveling around the edge of the field with a seeding implement at least once and often two or more times along adjacent consecutively smaller paths prior to traveling in parallel rows through the field. These field edge paths are generally referred to in the industry as headland passes. By performing one or more headland passes about a field edge prior to performing parallel passes, the farmer provides a space for turning the tractor and implement around between parallel passes while still covering the entire space along the field edge.

While headland passes increase overall field coverage, whenever a tractor is driven over field sections that have already been seeded, the tractor and implement wheels crush the seeds or growing plants that they pass over and therefore reduce overall field production (i.e., yield per acre). For this reason, as known in the industry, where possible, farmers routinely attempt to reduce the number of headland passes required in a field.

Unfortunately, the number of headland passes required to facilitate complete field coverage is related to the turning radius of a tractor and implement combination and the combination turning radius is directly related to the length of the tongue member between the implement and the tractor. Thus, for instance, where the tongue is six feet long the turning radius may require only one headland pass while a twenty foot long tongue may require two or more headland passes to facilitate complete coverage.

Recognizing that a short tongue during implement operation reduces the number of required headland passes and therefore increases efficiency and that a long tongue is desirable to accommodate pivotal and scissors type implement configurations, some industry members have developed staged tongue members that expand to accommodate implement transport and retract to provide a minimal turning radius during implement operation. One of these solutions provides a single stage telescoping tongue member including a first tongue member mounted to an implement chassis and a second tongue member that is telescopically received in the first tongue member. To facilitate expansion and retraction, a hydraulic cylinder is positioned within one of the first and second tongue members with a base member mounted to one of the tongue members and a rod secured to the other of the tongue members. With relatively large implements and tractors, the force required by the cylinder is relatively large. By placing the cylinder inside the tongue members, cylinder force is evenly distributed thereby reducing cylinder wear, reducing cylinder requirements and increasing the useful cylinder life cycle.

While better than non-telescoping tongue members, unfortunately, single stage members cannot telescope between optimal maximum and minimum lengths. For this reason, where single stage tongue members have been employed, either extended implement operating width has been minimized or extra headland passes have been used to accommodate a larger than optimum turning radius.

One other solution has been to provide a multi-stage tongue member that is able to telescope between optimal maximum and minimum lengths. Designing workable multi-stage tongue assemblies, however, has proven to be a difficult task. To this end, a separate cylinder is required for each stage in a multi-stage assembly. For instance, in a two stage assembly at least two cylinders are required. Unfortunately, in the case of a retracted multi-stage tongue assembly, the retracted assembly can only accommodate a single internally mounted cylinder (i.e., a cylinder mounted within the internal tongue assembly member). As indicated above, to balance cylinder load during operation and thereby minimize cylinder wear and increase useful cylinder lifecycle, the industry has opted to place tongue dedicated cylinders inside tongue member passageways and external tongue dedicated cylinders have not been considered a viable option.

One exemplary and seemingly workable multi-stage tongue assembly is described in U.S. Pat. No. 5,113,956 which is entitled "Forwardly Folding Tool Bar" and which issued on May 19, 1992 (hereinafter "the '956 patent"). The implement configuration in the '956 patent teaches a scissors-type implement having left and right bar members mounted to a wheel supported chassis for pivotal rotation between an extended operating position and a transport position over the tongue assembly. The tongue assembly is mounted to the chassis and extends toward a tractor including several (e.g., 5) telescoped tongue members including a distal tongue member 14 that actually links to a tractor hitch. To move the bar members between the operating and transport positions the '956 patent teaches that first and second hydraulic cylinders are mounted between the chassis and a point spaced from the chassis on each of the right and left bar members, respectively. By extending cylinder rods, the bar members are driven into extended operating positions and when the rods are retracted the bar members are driven into transport positions.

The '956 patent teaches that the tongue assembly can be extended and retracted while the bar members are driven between their operating and transport positions and by the first and second hydraulic cylinders by attaching braces between the bar members and the distal tongue member. More specifically, a first rigid brace is pivotally secured at one end about midway along the right bar member and so as to form an acute angle therewith and at an opposite end to the distal tongue member and a second rigid brace is pivotally secured at one end about midway along the left bar member so as to form an acute angle therewith and at an opposite end to the distal tongue member. The '956 patent teaches that when the cylinder rods are retracted so that the bar members are in the transport position, the tongue assembly is extended so that the distal end of the assembly clears the ends of the bar members. When the cylinder rods are extended, the bar members are driven toward their extended operating positions and the braces simultaneously pull the distal tongue member toward the chassis thereby causing the tongue assembly to retract. By reversing the rods so that the rods extend, the braces force the distal tongue member away from the chassis thereby causing the tongue assembly to extend. Thus, the '956 patent configuration replaces the tongue dedicated rods with the first and second braces on opposite sides of the tongue assembly, the braces in effect operating as rods to extend and retract the tongue assembly and providing a balanced load to the distal tongue member during extension or retraction.

The '956 solution, like other solutions, has several shortcomings. First, because the '956 patent configuration cylinders are linked between the chassis and the bar members, in the case of some implements, the cylinders will get in the way of implement components (e.g., seeding buckets, ground engaging tools, etc.). Similarly, because of the locations of the braces (i.e., secured between central points of the braces and the distal tongue member), the braces also will obstruct use of certain implement components.

Second, in order to simultaneously drive the bar members between the operating and transport positions and drive the distal tongue member between the retracted and extended positions, the cylinders have to be relatively large and therefore expensive. One way to reduce cylinder size is to modify the implement configuration to increase the acute angles that the braces form with each of the bar members when the bar members are in the extended operating positions. This solution, however, leads to a third problem with the '956 patent configuration. Specifically, to simultaneously provide a workable design including braces and accommodate larger acute angles that enable the use of smaller cylinders, the overall retracted tongue assembly length must be increased which is contrary to the primary purpose for which the assembly has been designed (i.e., to reduce tongue length during implement operation and increase tongue length during implement transportation).

In any extendable tongue assembly design, it is important to provide some mechanism to maintain the tongue assembly in the retracted position during implement operation and in the extended position during transport. In the case of configurations that rely on hydraulics to drive tongue members between extended and retracted positions, assuming the hydraulic system operates properly, the hose and cylinder pressures can generally be relied upon to maintain assembly positions. However, sometimes hydraulic systems fail and therefore, ideally, some backup locking system is provided.

Some assembly designs provide a manually operated mechanical locking mechanism to accomplish this task. For instance, to lock an assembly in an extended position, a farmer may be required to insert a locking pin through tongue member apertures that align when the assembly is retracted. Similar steps may also be used to lock the assembly in the extended position. Unfortunately, in the case of manual locking mechanisms, farmers may opt not to use the manual mechanisms and instead may simply rely upon the integrity of the hydraulic system.

Still other systems have been designed to include automatic locking mechanisms. For instance, referring again to the '956 patent, the '956 patent teaches a hydraulically operated latch locking mechanism that is mounted to the distal tongue member that engages a stop member that extends from the tongue member mounted to the chassis when the assembly is in the retracted position. When the assembly is in an extended position and the bar members are in a transport position, downward extending hooks at the distal ends of the bar members are positioned over receiving apertures such that, when implement support wheels are raised, if the hooks and apertures are properly aligned, the hooks are received in the apertures and lock the entire assembly, including the tongue members, in position for transport.

While better than a manual mechanism that may be ignored, the '956 patent locking mechanism still has shortcomings. For instance, the latching mechanism relies on gravity to maintain the latch over the stop member while the implement is in the operating position. Where an implement is pulled through a field and hits a bump or a pot hole, the latch member may be jostled upward overcoming gravity and thereby becoming unlatched. Similarly, during transport the implement may be jostled thereby causing the hooks to lift out of the receiving apertures so that the assembly becomes unlocked.

In addition, the hook and aperture transport locking mechanism may not always operate well as alignment of the hooks and apertures is required for successful operation and therefore manufacturing and operating tolerances have to be relatively tight. This is especially true where movement from the operating to the transport positions has to be performed in an uneven field environment where similar hydraulic forces may drive the left and right hand bar members to different relative positions with respect to receiving apertures (i.e., after movement toward the transport positions the bar member hooks on the left and right bar members may be differently aligned with receiving apertures on the distal tongue member so that some type of manual adjustment is necessary).

Moreover, the '956 patent requires separate mechanisms for locking the tongue assembly in each of the extended and retracted positions. As in the case of any apparatus, additional components typically translate into higher manufacturing and maintenance costs and therefore should be avoided whenever possible.

In addition to the problems described above, foldable apparatus have other shortcomings. For example, during pivoting or scissors type movement of implement bars to convert an assembly between transport and operating positions, the bars have to be supported in horizontal positions during conversion. One solution has been to provide a relatively robust pivot pin and corresponding components to provide the required support. This solution is disadvantageous as the costs associated with a reliable pivot pin and components of this type are relatively high.

Another solution for supporting implement bars during conversion has been to maintain wheels on the distal ends of the bars in ground engaging positions that support the distal ends there above. After conversion to the transport position, the ground engaging wheels are typically raised to upright positions where the wheels clear the ground below and the entire assembly is supported by a carrier frame and corresponding wheels. While this solution works relatively well when an assembly is positioned on a flat horizontal surface such as a road or a paved area, this solution does not work well under typical conversion circumstances. For instance, where conversion is attempted in an uneven field or in a field wrought with ruts, the force required to drive the ground engaging wheels over peaks and out of valleys is appreciable. Thus, while this solution is typically better than the unsupported solution, this solution generally requires relatively powerful motors and/or hydraulic systems to facilitate conversion. It should also be noted that this solution may prohibit conversion under certain circumstances where terrain blocks movement of the ground engaging wheels.

Yet another solution is described in the '034 patent. To this end, the '034 patent teaches that the pivot point is positioned adjacent a rear corner of a carrier frame with a nylon track runner forming an arc there around that extends between first and second track ends where the first end is at the other rear corner of the carrier frame. A mainframe is pivotally mounted at the pivot point to the carrier frame for rotation there around. A bottom portion of the mainframe rests on the track runner and slides there along during conversion.

By employing the '034 patent solution, advantageously, no components attached to the implement bar contact the ground there under and therefore ground engaging wheels do not impede conversion. Unfortunately, however, it has been found that even the '034 patent solution has shortcomings. Specifically, because the implement bar and attached components are often collectively heavy, the friction between the bottom portion of the mainframe and the track runner is often appreciable and therefore requires powerful and expensive hydraulics and/or motors.

Second, while manufacturing techniques are relatively good and therefore newly manufactured agricultural assemblies are well aligned and function properly, over the course of one or more seasons of use, many implements and components become misaligned or, in some cases, actually change their shape with wear. In the case of a pivotal-type implement, the implement bar and corresponding components have been known to become misaligned and even change shape (i.e., distal bar ends may droop over time). The '034 patent configuration does not provide means for compensating for misalignment or to compensate for implement bar shape deformation due to wear.

Therefore, a need exists for a system that enables easy conversion of a carrier frame mounted implement bar between transport and operating positions and to compensate for assembly component misalignment and deformed implement bar shape.

SUMMARY OF THE INVENTION

It has been recognized that a wheel assembly can be attached to a mainframe and that is received on an arcuate track runner to reduce the friction between the mainframe and the track runner during conversion and thereby reduce the amount of force required to drive the mainframe and attached implement bar during conversion. It has also been recognized that the vertical position of the wheel relative to the mainframe can be made adjustable such that the wheel assembly can be used to compensate for assembly component misalignment and component deformation due to wear.

Consistent with the above, the present invention includes an agricultural apparatus comprising a carrier frame including a support surface defining an arcuate track about a pivot point, a mainframe mounted to the carrier frame at the pivot point for rotation thereabout between an operating position and a transportation position and a wheel assembly including at least one wheel mounted to a mounting member, the mounting member mounted to the mainframe such that the wheel is received on the curved track for rotation there along.

In at least one embodiment the mounting member includes first and second plates and the wheel is mounted between the plates. More specifically, the mounting member may include an adjustment bolt linked between the mainframe and the plates wherein the adjustment bolt is adjustable to alter the relative positions of the mainframe and the plates thereby modifying the relative positions of the mainframe and the carrier frame. Even more specifically, the mounting member may further include first and second block members linked to the mainframe and the plates, respectively, one of the block members forming a right threaded channel and the other of the block members forming a left threaded channel and, wherein, the adjustment bolt includes first and second ends that are right and left threaded, respectively, the adjustment bolt ends received in the block member channels.

In some embodiments the first end of the adjustment bolt is received in the first block member channel, the first block member includes a jamming surface facing the second blocking member, the apparatus further including a jam nut threadably received on the first end of the bolt such that the jam nut can be tightened against the jamming surface to lock the relative positions of the bolt and the first and second block members.

In several embodiments each of the first and second plates has proximal and distal ends and the wheel in mounted between the proximal and distal ends, the proximal ends are pivotally linked to the mainframe and the distal ends pivotally linked to the second block member. Here, each plate may be mounted to the mainframe, second block and wheel at first, second and third mounting points, respectively, that form a triangle, the third mounting point below at least one of the first and second mounting points. Also, here the apparatus may further include a bracket mounted to the mainframe, the first block pivotally mounted to the bracket at a first point and the first ends of the plates mounted to the bracket at a second point below the first point. The bracket may extend in a direction tangent to the arcuate track.

The track may extend between first and second ends and, when the mainframe is in the operating position, the mainframe may be substantially perpendicular to a direction of travel and substantially aligned with a rear edge of the support surface such that the bracket extending at least in part past the rear edge and proximate the first end.

In some embodiments the track extends between first and second ends, when the mainframe is in the operating position, the mainframe substantially perpendicular to a direction of travel and substantially aligned with a rear edge of the support surface and the wheel extending at least in part past the rear edge and proximate the first end, the carrier frame further including a wheel support member extending from the rear edge and forming an upwardly facing surface that is substantially parallel to the support surface and that forms the first end.

In several embodiments the mounting member further includes an adjustment means for adjusting the relative positions of the wheel and the mainframe such that the relative positions of the mainframe and the carrier frame can be adjusted.

The carrier frame may include first and second lateral edges and the track extends between first and second track ends where the wheel is proximate the first and second track ends when the mainframe is in the operating and transport positions, respectively, the pivot point is proximate the first lateral edge and the first track end is proximate the second lateral edge.

The invention further includes an apparatus for use with an agricultural assembly including a carrier frame including a support surface defining an arcuate track about a pivot point and a mainframe mounted to the carrier frame at the pivot point for rotation thereabout between an operating position and a transportation position, the apparatus comprising a wheel assembly including a mounting member, a wheel and at least one adjustment bolt, the mounting member mounted to the mainframe and the wheel linked to the mounting member via the adjustment bolt such that the wheel is received on the curved track for rotation there along, the adjustment bolt adjustable for modifying the relative vertical positions of the wheel and the mainframe to adjust the positions of the mainframe and the carrier frame.

In some embodiments the mounting member includes first and second plates linked to the mainframe and the adjustment bolt and wherein the wheel is mounted between the plates. More specifically, the mounting member may further include first and second block members linked to the mainframe and the plates, respectively, one of the block members forming a right threaded channel and the other of the block members forming a left threaded channel and, wherein, the adjustment bolt includes first and second ends that are right and left threaded, respectively, the adjustment bolt ends received in the block member channels. Even more specifically, the first end of the adjustment bolt may be received in the first block member channel, the first block member may include a jamming surface facing the second blocking member, the apparatus may further include a jam nut threadably received on the first end of the bolt such that the jab nut can be tightened against the jamming surface to lock the relative positions of the bolt and the first and second block members.

Each of the first and second plates may have proximal and distal ends and the wheel may be mounted between the proximal and distal ends, the proximal ends may be pivotally linked to the mainframe and the distal ends pivotally linked to the second block member. Here, each plate may be mounted to the mainframe, second block and wheel at first, second and third mounting points, respectively, that form a triangle, the third mounting point below at least one of the first and second mounting points.

The invention additionally includes an apparatus for use with an agricultural assembly including a carrier frame including a support surface defining an arcuate track about a pivot point and a mainframe mounted to the carrier frame at the pivot point for rotation thereabout between an operating position and a transportation position, the apparatus comprising first and second plates, each plate including proximal and distal ends and defining first, second and third mounting points, the proximal ends pivotally linked to the mainframe at the first mounting points, a turnbuckle including first and second block members and a bolt, one of the block members forming a right threaded channel and the other of the block members forming a left threaded channel, the bolt including opposite first and second ends that are right threaded and left threaded, respectively, the bolt ends received within the channels, the first block member pivotally linked to the mainframe above the plates and the second block member pivotally linked to the plates at the second mounting points and a wheel mounted between the plates at the third mounting points such that the wheel is received on the track.

In one aspect the mounting points on each of the plates may form a triangle and each second mounting point may be vertically below at least one of the first and second mounting points on the same plate. In addition, in some embodiments a bracket may be mounted to the mainframe wherein the proximal ends of the plates and the first block members are pivotally mounted to the bracket. Here, the bracket may be proximate and extend toward the first end of the track when the mainframe is in the operating position.

BRIEF DESCRIPTION OF THE DRAWINGS

FIG. 34 is a top plan view of the main frame assembly with the carrier assembly shown in the transport position.

DETAILED DESCRIPTION OF THE PREFERRED EMBODIMENTS

Referring now to FIGS. 1 through 4, a preferred embodiment of the present invention will be described in the context of an agricultural assembly 10 which includes a carrier frame assembly 12, a main frame assembly 69 and an implement assembly 15. As its label implies, carrier frame assembly 12 includes components configured to facilitate transport or carrying of other assembly 10 components. Similarly, as their labels imply, main frame assembly 69 includes components configured to generally support any of several different implement assemblies while implement assembly 15, includes components used to carry out a specific agricultural process corresponding to a specific implement. For instance, the components that comprise the implement assembly may be used for tilling, fertilizing, planting, etc. Main frame assembly 69 is mounted to carrier frame assembly 12 and implement assembly 15 is mounted to main frame assembly 69.

The present invention generally resides in the carrier frame assembly 12 and, more particularly, in the tongue or hitch sub-assembly that forms part of the carrier frame assembly 12. For this reason, hereinafter, first, an exemplary implement assembly 15 and the main frame assembly 69 are described in minimal detail and thereafter carrier frame assembly 12 is described in greater detail.

Figure 3:
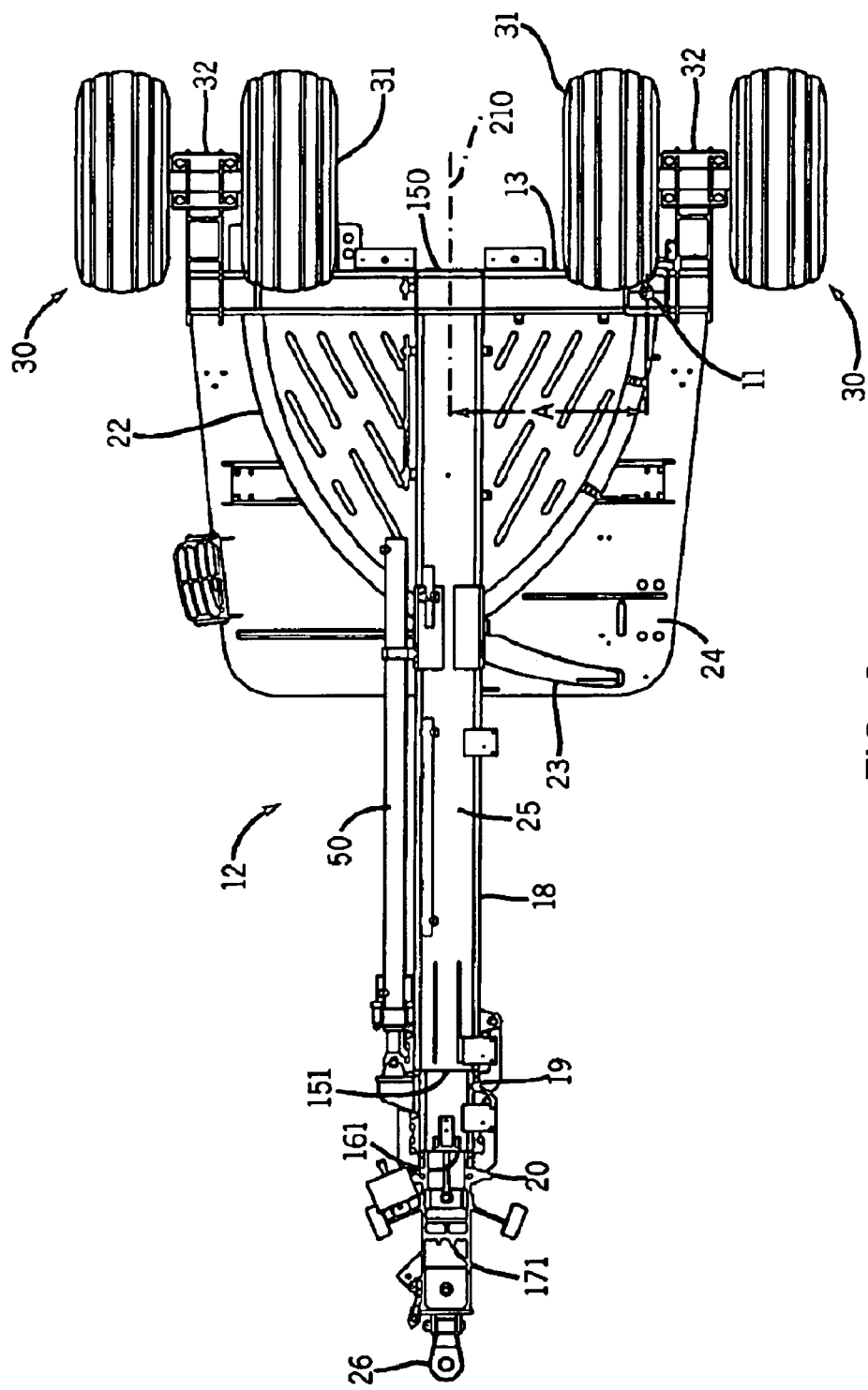
FIG. 3 is a bottom plan view of the carrier frame illustrated in FIG. 1.
Figure 4:
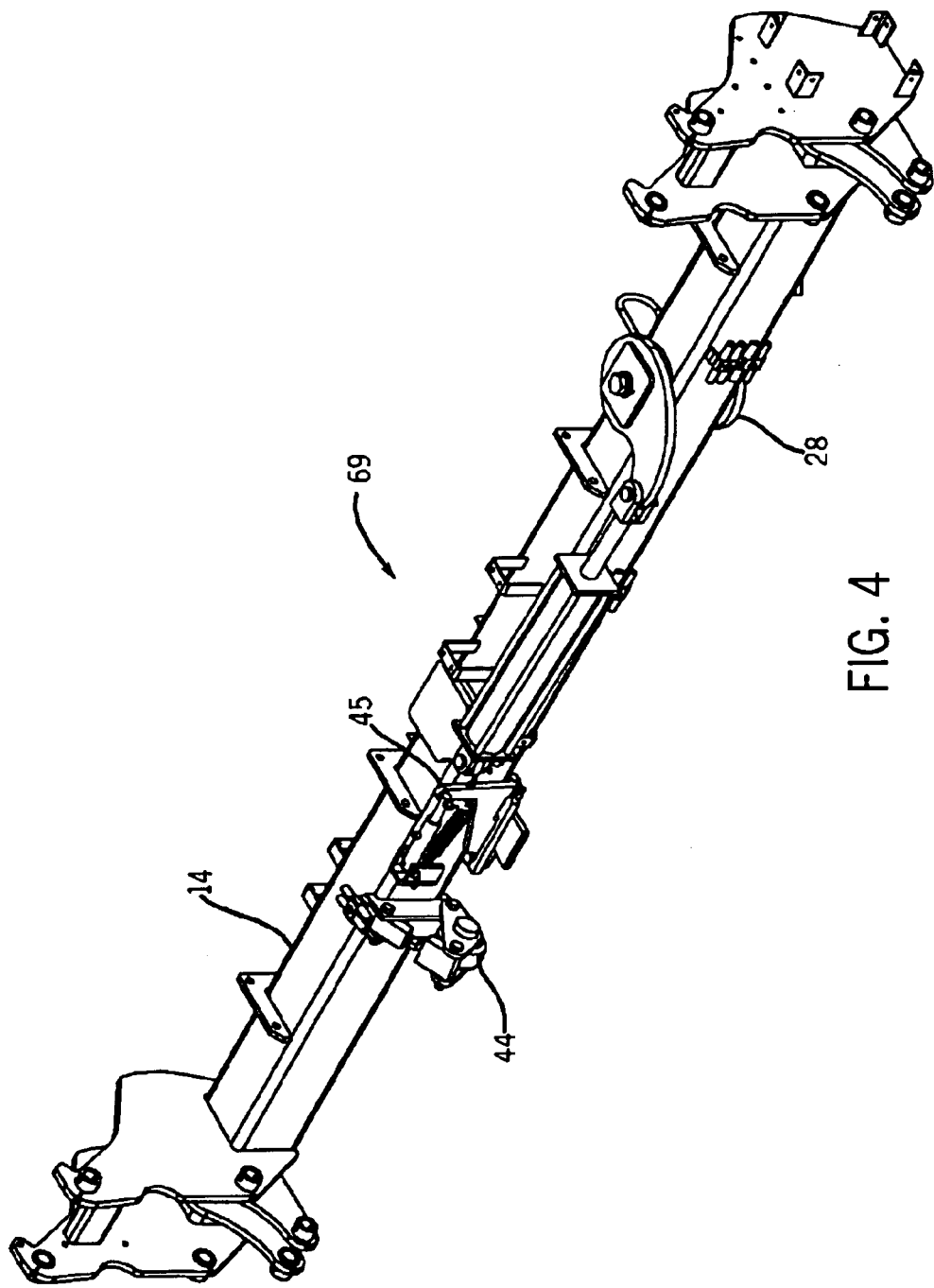
FIG. 4 is a perspective view of a mainframe assembly used with the configuration of FIG. 1.
Figure 5:
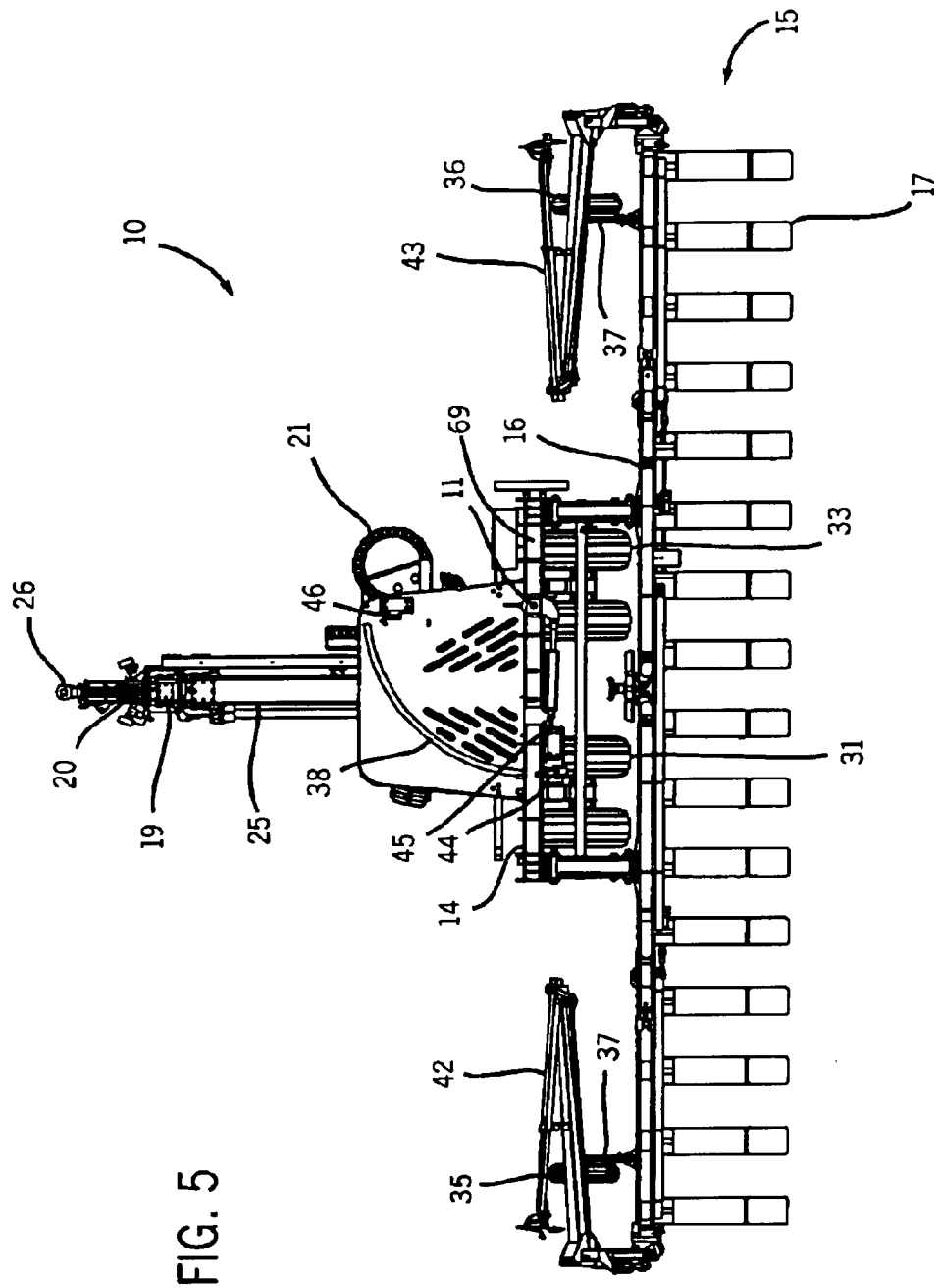
FIG. 5 is a top plan view of the embodiment of FIG. 1 in an extended operating position.

Referring still to FIGS. 1 through 4 and also to FIG. 5 (and generally to other Figures in the specification), the exemplary implement assembly 15 includes a bar member 16, implement components 17 (e.g., planting devices), wheels 35, 36, wheel support members 37 and extendable markers 42, 43. Bar member 16 is typically a rigid steel rectilinear bar having dimensions within the six by six to ten by ten range and extends along the length of implement assembly 15. Bar 16 is generally mounted to main frame assembly 69 in any manner known in the art and the relationship between implement assembly 15 and the main frame assembly 69 is adjustable.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10.

Figure 6:
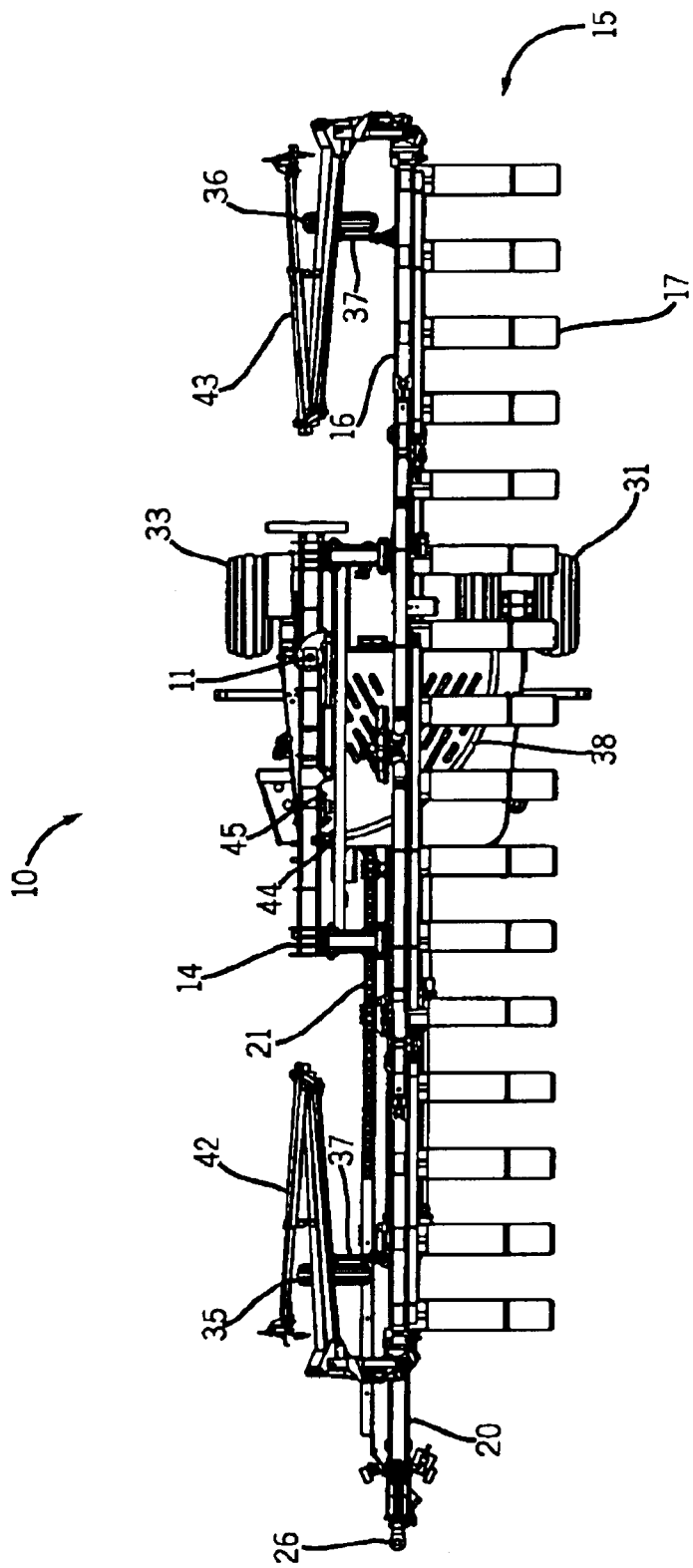
FIG. 6 is a top plan view of the embodiment of FIG. 1 in a transport position.

Referring now to FIG. 4 and also to FIGS. 29 through 34, the main frame assembly 69 includes, among other components, a main frame bar member 14, a roller assembly 44, a latching assembly 45 and a rotating assembly 269. Bar member 14 forms a pivot aperture 234 approximately one-fourth the length of bar member 14 from a first end thereof for receiving a carrier frame assembly pivot pin (see 34 in FIG. 2). Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

An attachment plate 252 is securely mounted to a top surface of bar member 14 approximately half way along the length of member 14. With pivot pin 34 extending up and through aperture 234, an eccentric 256 including an extension member 251 is securely mounted to a top end of the pivot pin 34 with extension member 251 extending backward from bar member 14 and in the direction of plate 252. Cylinder 250 is pivotally secured to plate 252 and includes a rod 254 that extends toward and is pivotally secured to extension member 251. Extension of cylinder 250 causes the mainframe bar member 14 to rotate about pivot 11 from the operating position illustrated in FIG. 31 to the transport position illustrated in FIG. 34. When rod 254 is retracted, the mainframe bar member 14 rotates in the opposite direction toward the operating position illustrated in FIG. 31. FIG. 32 shows bar member 14 in an intermediate position.

Figure 29:
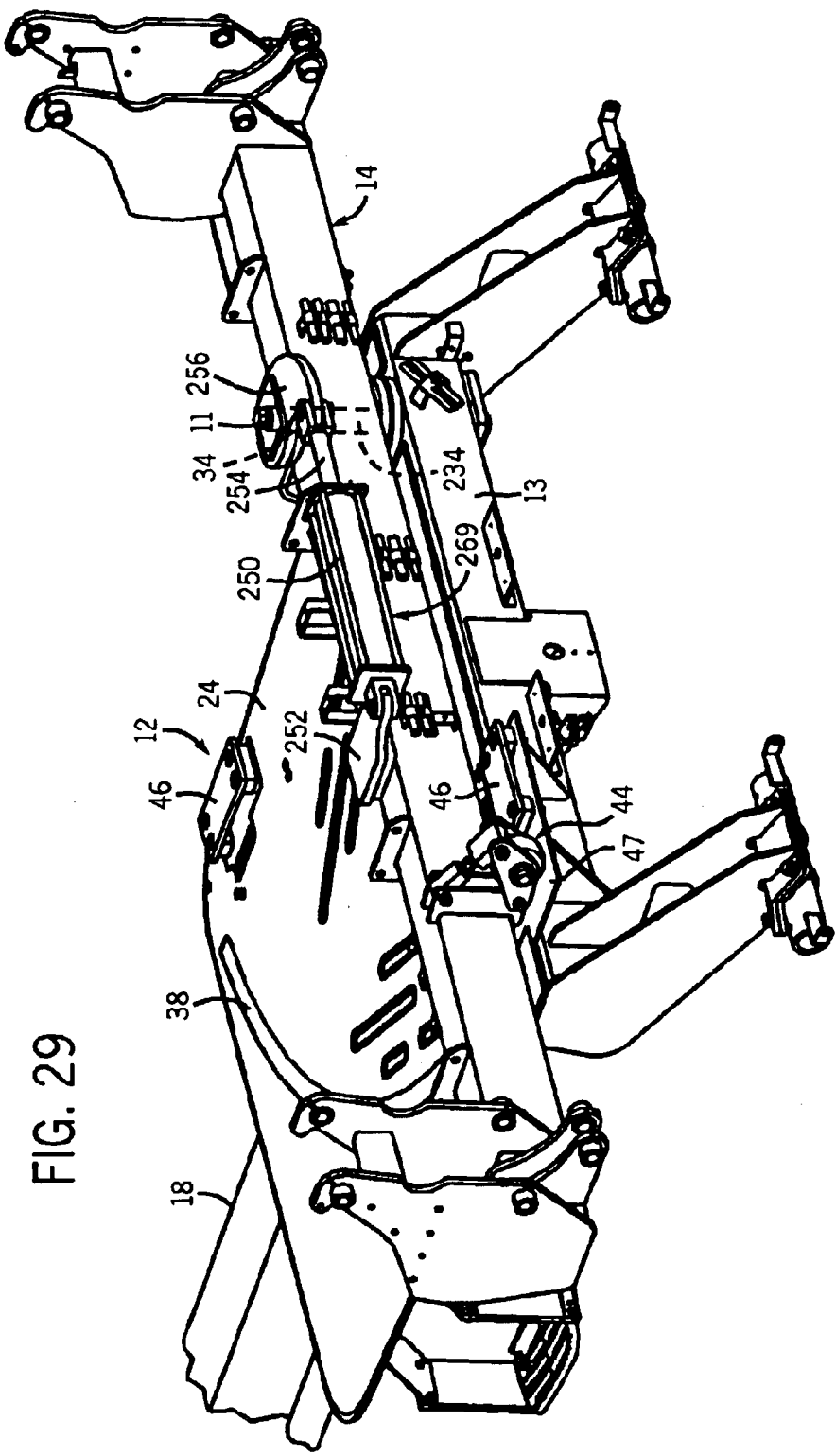
FIG. 29 is a perspective view of the main frame assembly shown in the operating position.

Roller or wheel assembly 44 is mounted to bar member 14 at a point about one-fourth the length of bar 14 from a second bar member 14 end (not numbered but shown as the left end in FIG. 29). Thus, aperture 234 and assembly 44 are, in the present example, essentially equispaced along the length of bar 14. Positioning of aperture 234 and wheel assembly 44 is important to ensure proper balancing of the attached implement assembly 15 and is generally a function of how best to balance assembly 15 about a carrier assembly axis 210 (see FIGS. 1 and 2).

Figure 30:
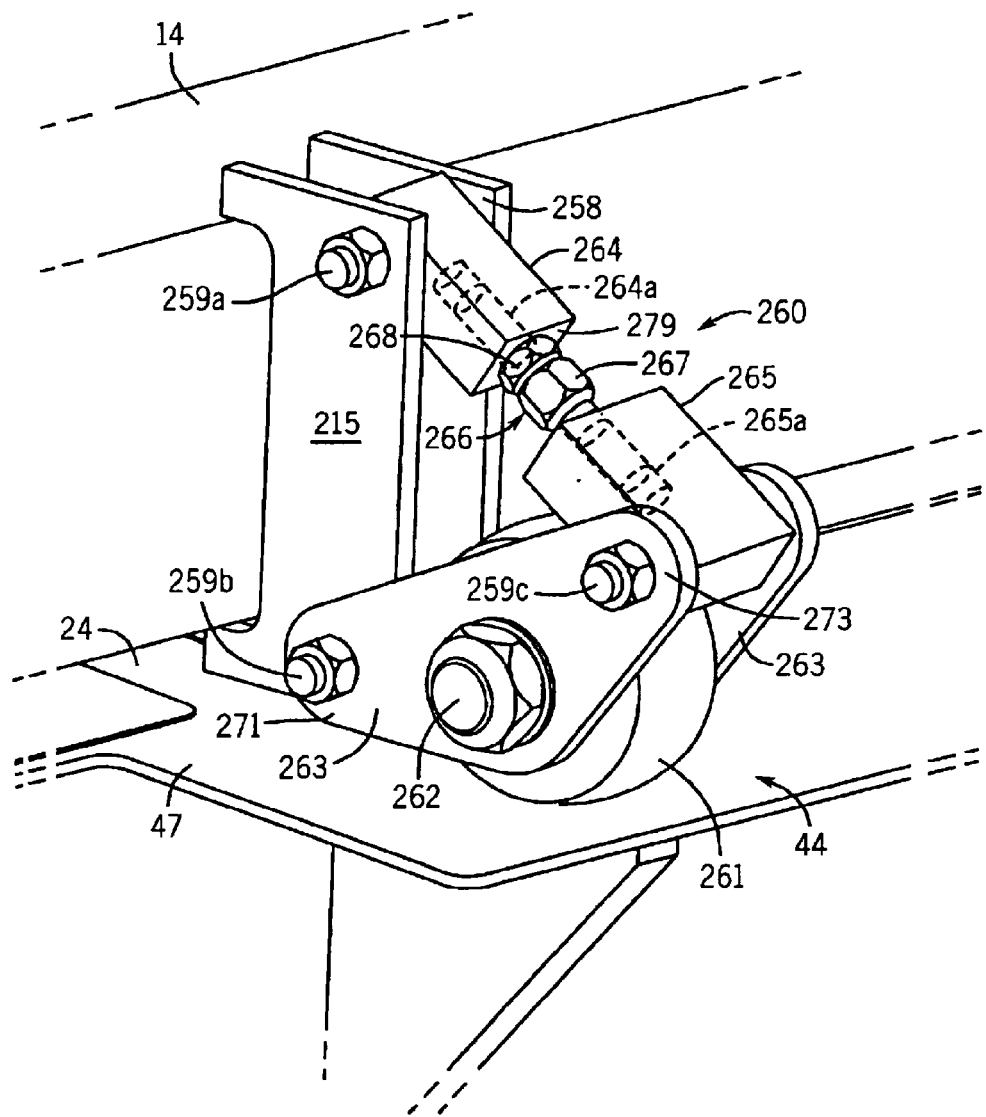
FIG. 30 is a detail perspective view of the support wheel assembly.
Figure 33:
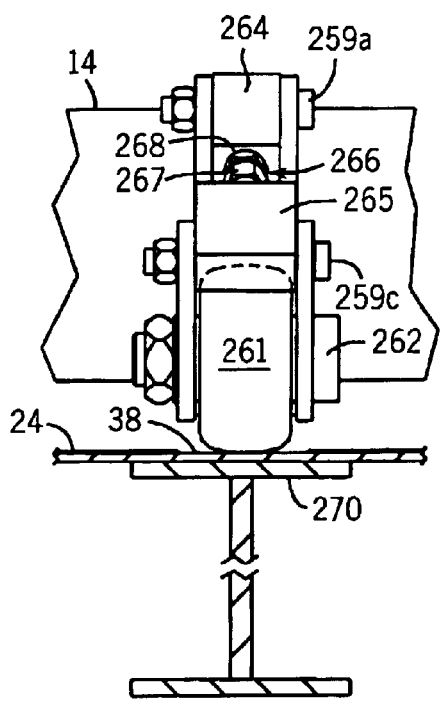
FIG. 33 is a side plan view of the wheel assembly of FIG. 29.

Referring to FIGS. 29, 30 and 33, assembly 44 includes a bracket 215, first and second plates, each plate identified by numeral 263, a turnbuckle assembly 260, a roller or wheel 261 and a plurality of bolts that secure assembly 44 components together. Bracket 215 is welded to bar member 14 and extends to a back side thereof. Thus, in the present embodiment, bracket 215 and assembly 44 generally are juxtaposed on the same side of bar 14 as is assembly 269 (see FIG. 29). Each plate 263 is generally triangular is shape having three mounting points (not separately numbered) that are centered on corresponding apertures. A separate mounting bolt is received through each of the plate apertures. In FIG. 30 bolts 259b, 259c and 262 are received through first, second and third apertures corresponding to the first, second and third mounting points, respectively. In the illustrated embodiment the first and second mounting points on each plate are at a proximal end 271 and a distal end 273 of plate 263, respectively and, the first, second and third mounting points on each plate define a triangle where the third mounting point corresponds to an obtuse angle and the first and second mounting points (i.e., the points corresponding to bolts 259b and 259c) correspond to equisized acute angles.

Referring still to FIGS. 30 and 33, the proximal end of each plate 263 is pivotally secured via a bolt 259b to a bottom end of bracket 215 with a corresponding distal end 273 extending rearward there from and away from bar member 14 and bracket 215. Wheel 261 is mounted at the third mounting points between plates 263 via a bolt 262.

Turnbuckle 260 includes first and second block members 264 and 265, a bolt 266 and a jam nut 268. Block member 264, as its label implies, includes a metal block having a flat jamming surface 279. A right threaded channel 264a extends into member 264 through surface 279. Block member 265 is similar to block member 264 except that member 265 forms a left threaded channel instead of a right threaded channel.

Bolt 266 includes oppositely extending and oppositely threaded ends and a hexagonal central head member 267 that is rigidly secured to the threaded ends. Each of the bolt 266 ends is received within a separate one of channels 264a and 265a. Because of the threading arrangement, when bolt 266 is rotated, blocks 264 and 265 are either forced apart of drawn together. Prior to threading a bolt 266 end into member 264, jam or locking nut 268 is threaded onto the end. With nut 268 on the bolt end, after bolt 266 end is received within recess 264a, if nut 268 is tightened against jamming surface 279, nut 268 and surface 279 cooperate to lock the block 264 and bolt 266 relative positions With the blocks 264 and 265, bolt 266 and nut 268 assembled, first block 264 is pivotally secured to an upper end of bracket 215 above the point where plates 263 are secured to bracket 215. Second block 265 is secured to plates 263 at the second mounting point corresponding to bolt 259c. When so configured and with the plate geometry described above, the third mounting point corresponding to bolt 262 should always be lower than at least one of the first and second mounting points corresponding to bolts 259b and 259c, respectively.

Referring still to FIG. 30, wheel 261 is sized such that when mounted as described above, a lower wheel surface is always below a bottom surface of bar 14 and the lowest part of bracket 215. In this way wheel 261 contacts surface 24 and supports bar member 14 and other components thereabove thereby reducing friction between the bar member 14 and the track runner during conversion. In addition, it should be appreciated that with nut 268 loosened, bolt 266 can be rotated to adjust how far downward that wheel 261 extends and hence to adjust the relative positions between bar member 14 and track 38. Because of the angle that turnbuckle 260 is on and the mechanical advantage associated with a screw type turnbuckle, the force required to turn bolt 260 is minimized which enables adjustment even when a planter apparatus or the like is completely loaded. After turnbuckle adjustment, nut 268 can again be tightened against surface 279 to lock the wheel position.

The adjustment mechanism illustrated is useful to compensate for component deformation due to extended wear or to correct for misaligned components.

Figure 7:
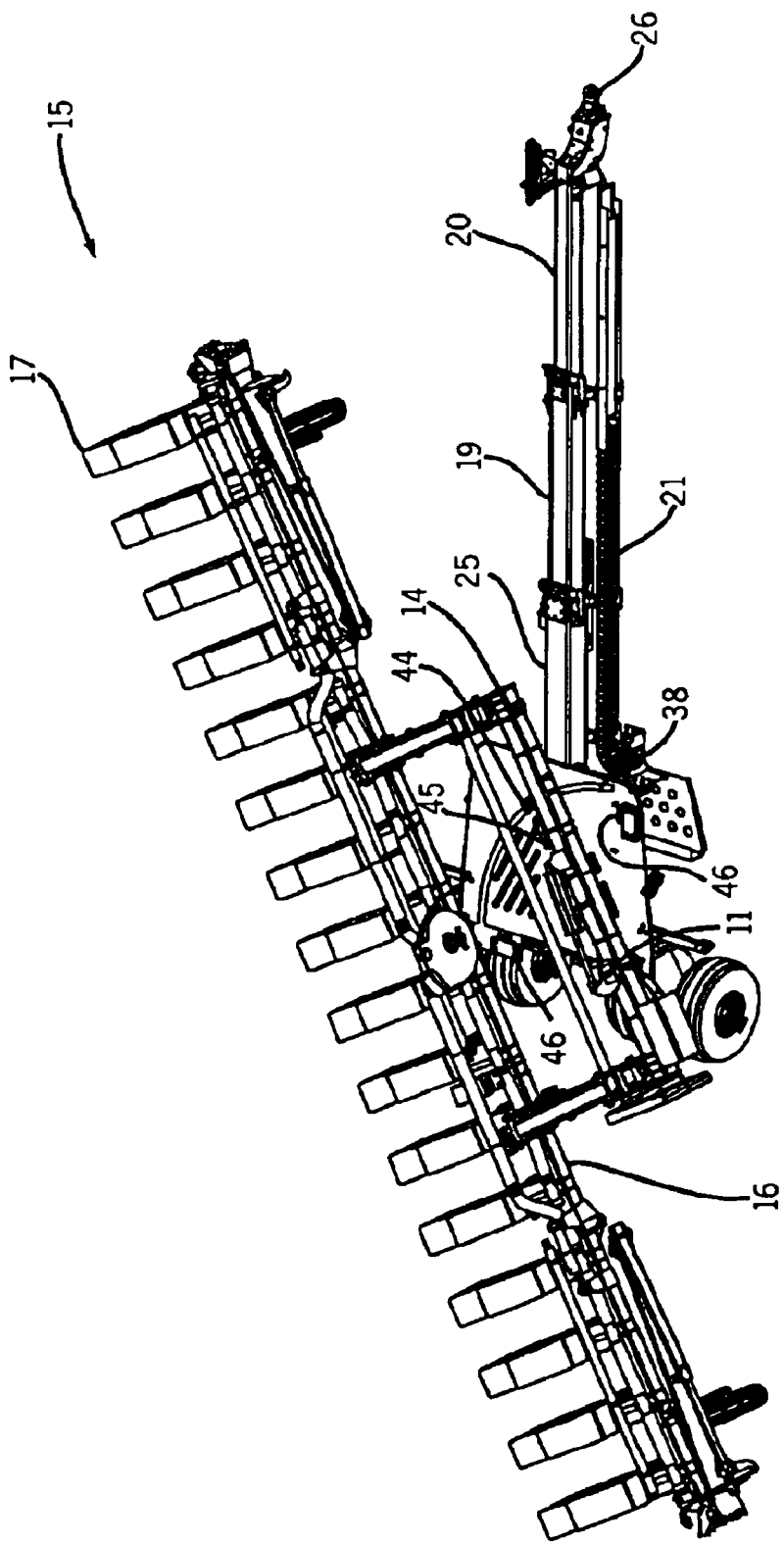
FIG. 7 is a perspective view of the embodiment of FIG. 1 in an intermediate position with an implement between the operating and the transport positions.
Figure 8:
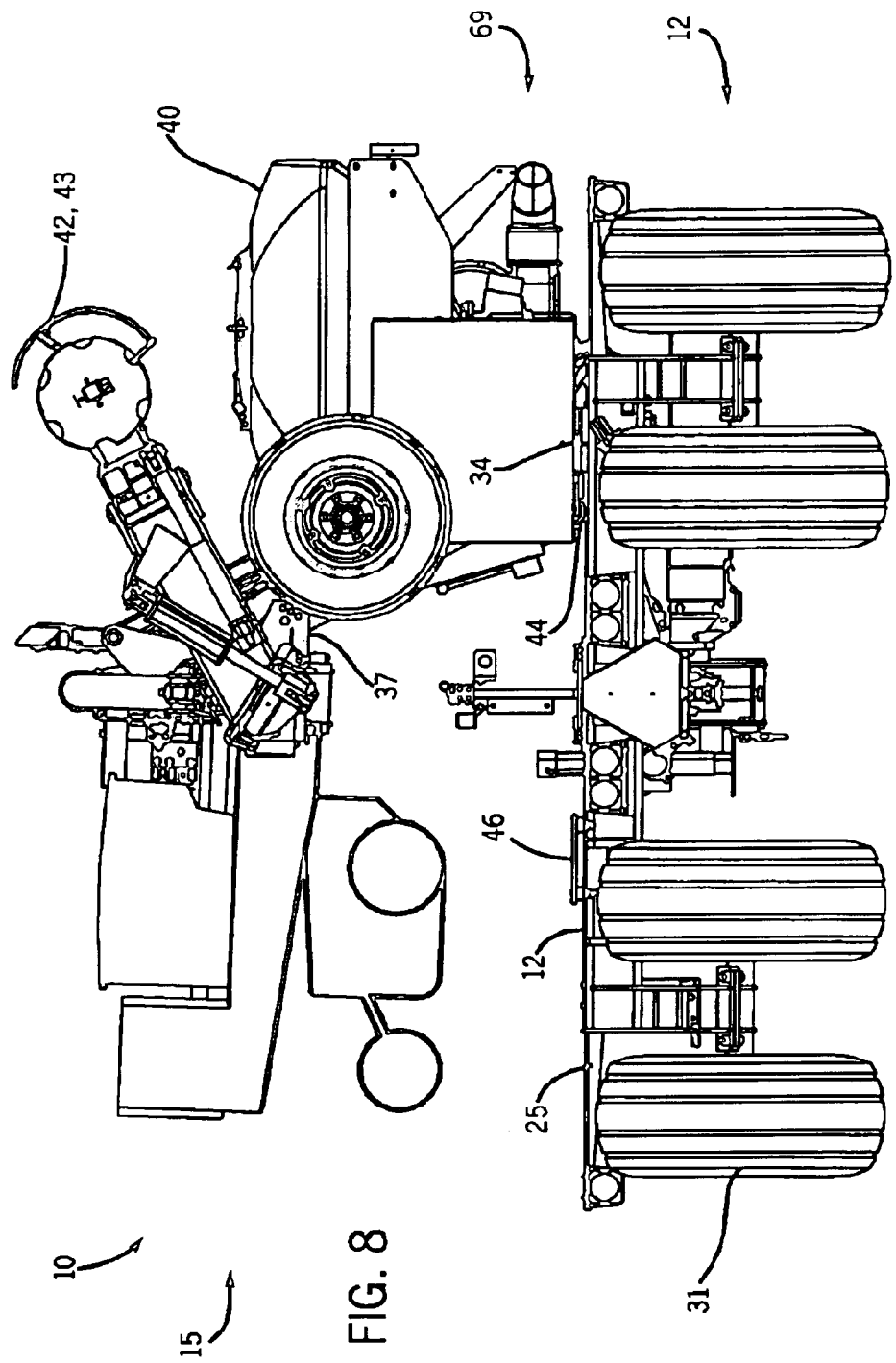
FIG. 8 is a rear perspective view of the embodiment illustrated in FIG. 1 with storage units attached and in the transport position.
Figure 9:
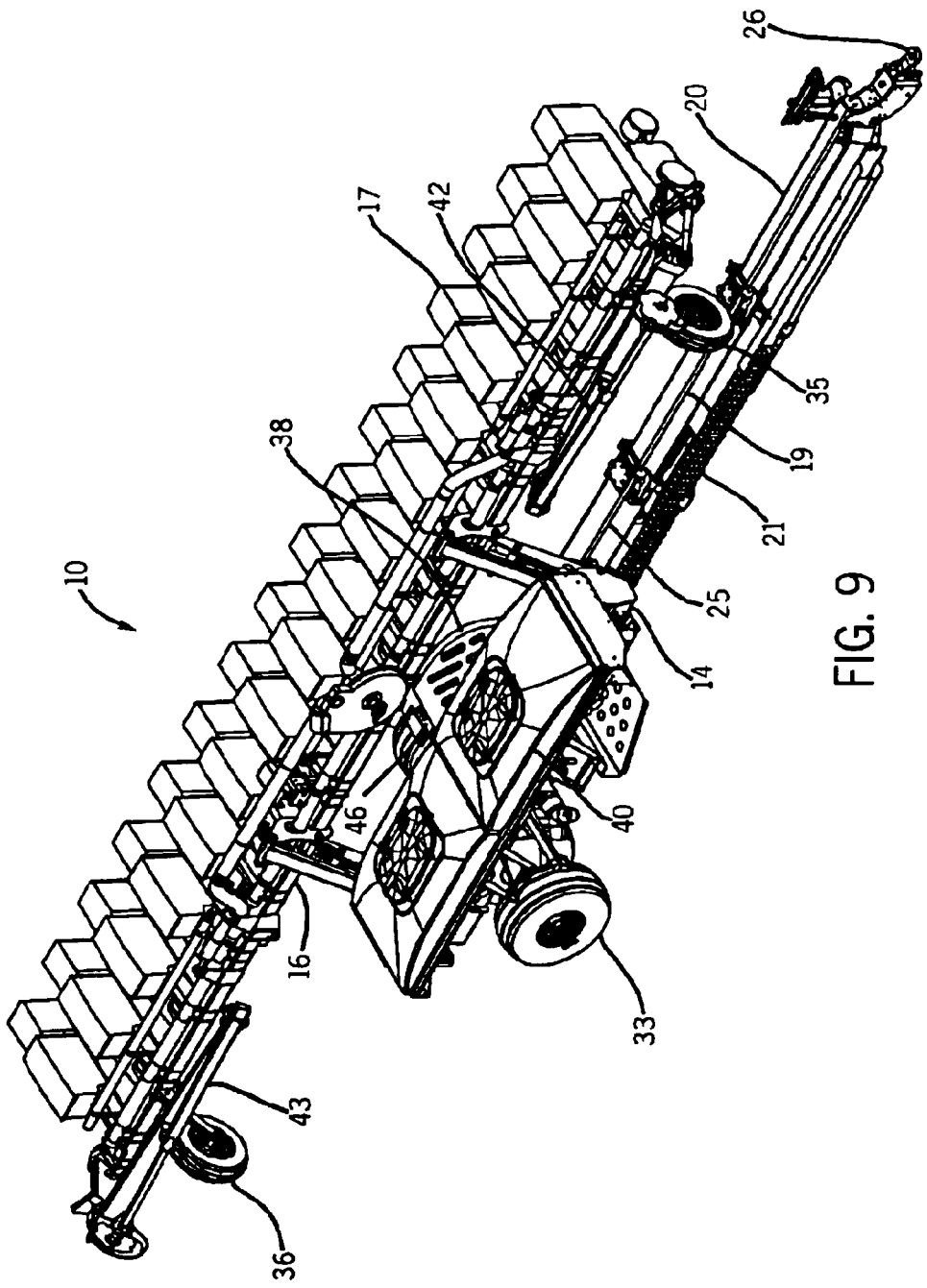
FIG. 9 is a perspective view of the embodiment of FIG. 8 with storage units in the transport position.

Bar member 14 is configured so as to have means for attaching the implement assembly bar member 16 to main frame bar member 14 at either end of the main frame bar member 14. Representative views that show attachment are FIGS. 1 and 5 through 7. While many linking means are contemplated, as illustrated in FIG. 4, exemplary means include rigid receiving plates and bolt holes (not separately numbered) for receiving some type of clamping brackets. Referring to FIGS. 8 and 9, in addition to the components described above, storage pods 40 are shown secured to the main frame bar 14.

Referring still to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of wheels 31 mounted on opposite sides of a corresponding support member 32.

Figure 11:
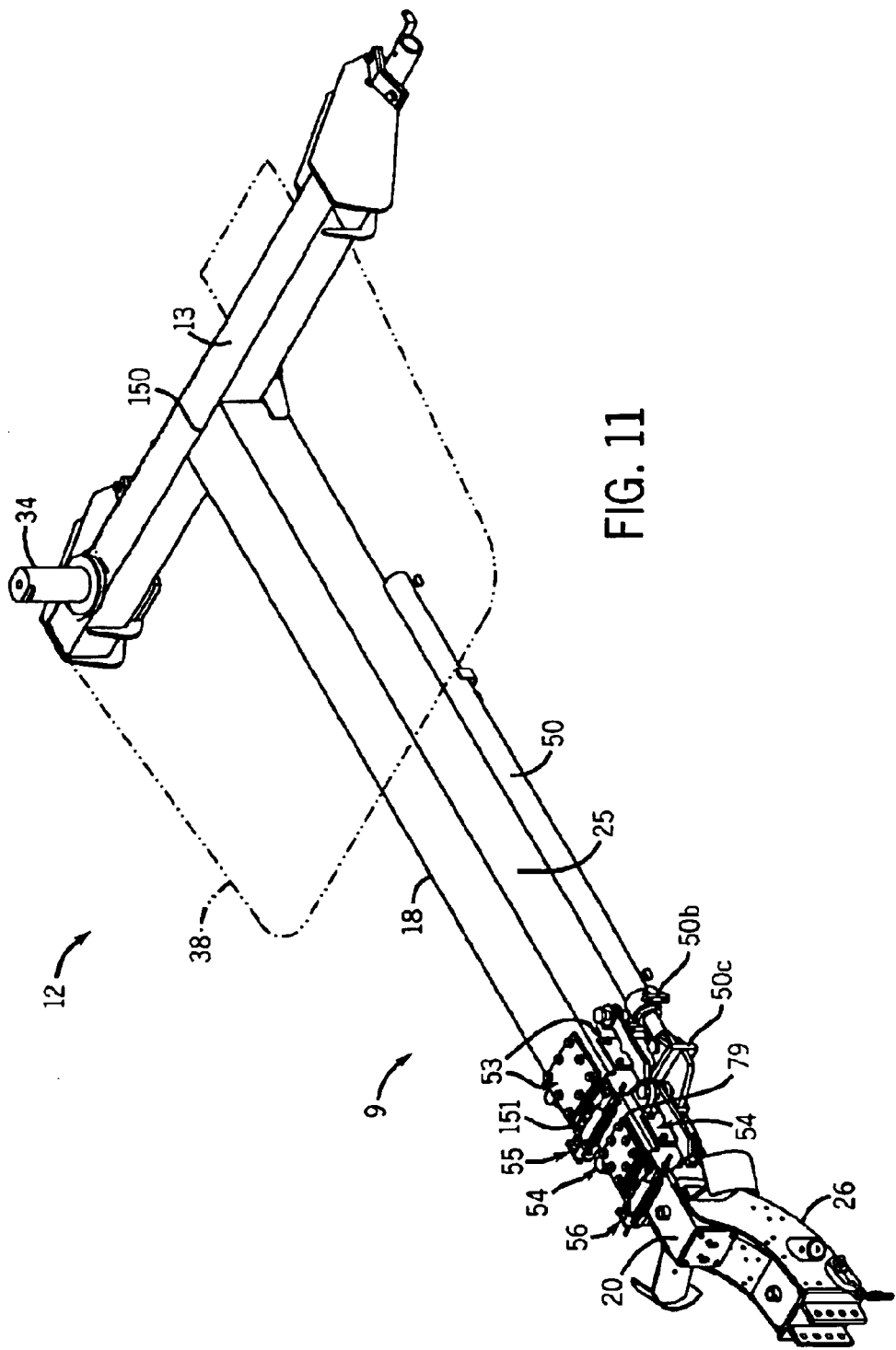
FIG. 11 is a perspective view of the carrier frame assembly of FIG. 10, albeit in a retracted or implement operating position.

Referring also to FIG. 11, cross bar 13 is a steel elongated bar. A separate one of wheel assemblies 30 is mounted at each one of the cross bar 13 ends and extends downward therefrom so that assemblies 30 support cross bar 13 above ground.

Referring still to FIG. 11, a pivot pin 34 is provided that extends upwardly from a top surface of bar 13. Pin 34 is formed about a vertical axis 11 and is formed so as to be receivable by the downwardly facing opening formed by pivot plate 28 (see FIG. 4) for rotation thereabout.

Figure 1:
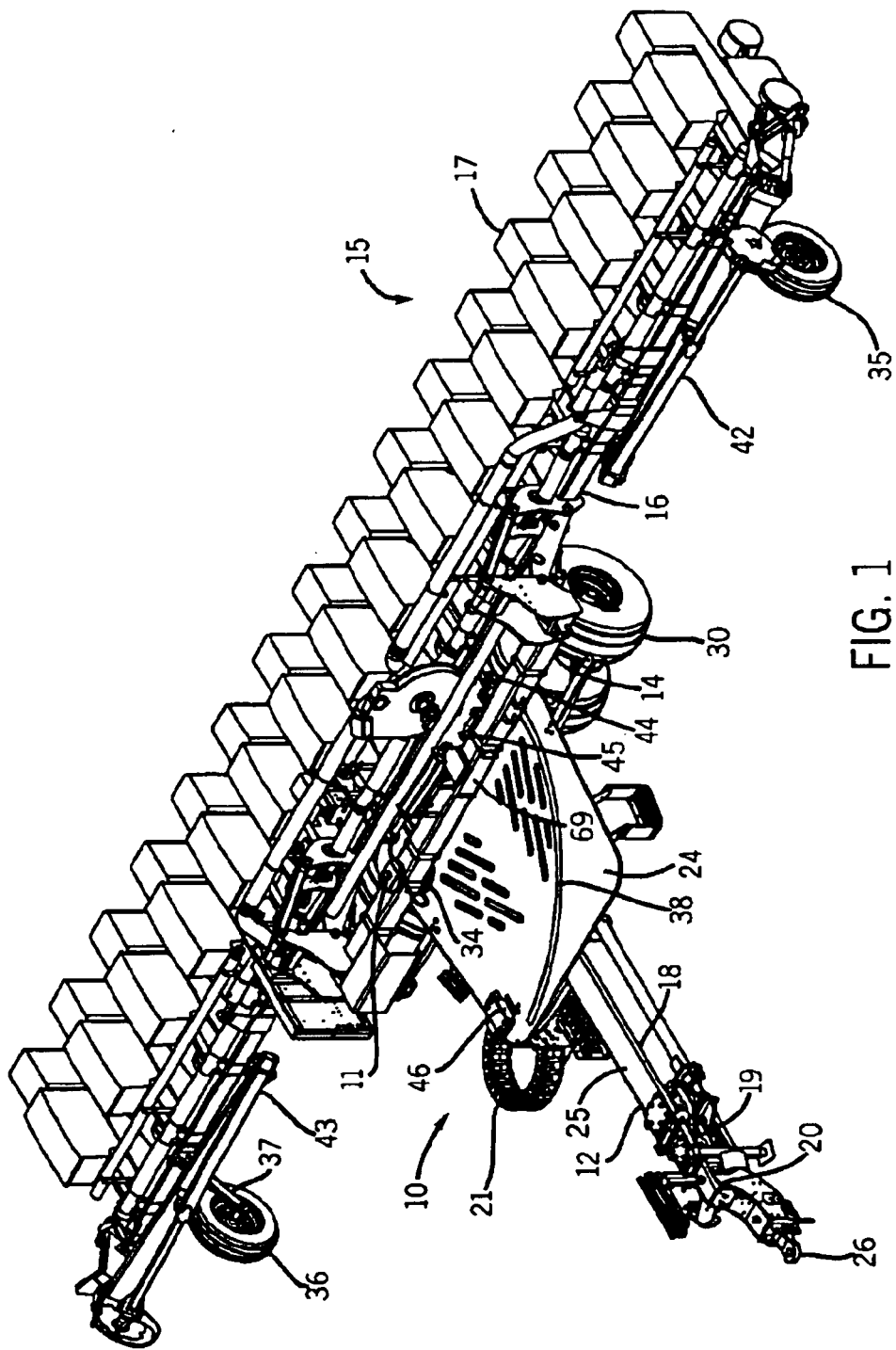
FIG. 1 is a is perspective view of a preferred embodiment of a planter apparatus constructed in accordance with one embodiment of the present invention.
Figure 2:
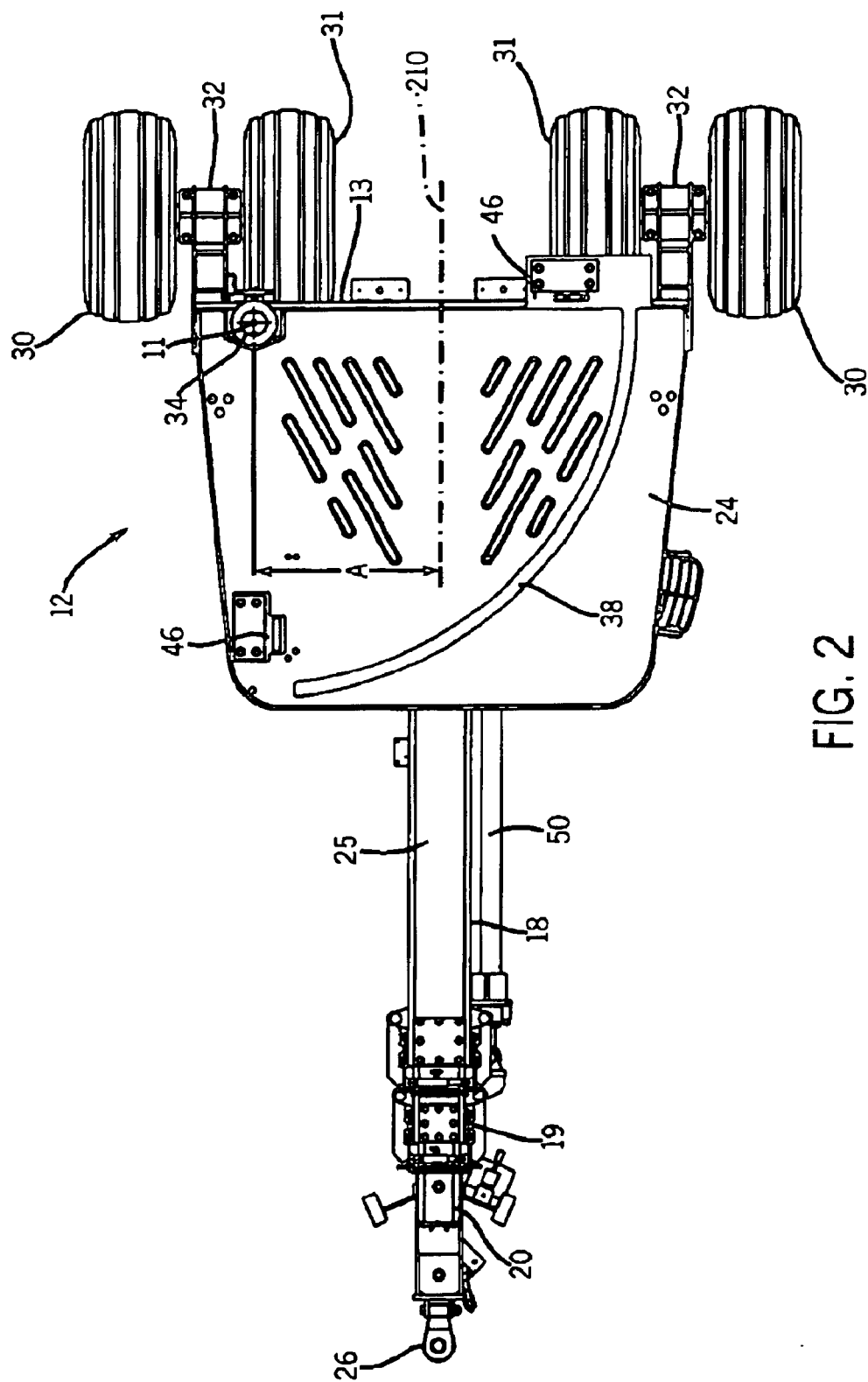
FIG. 2 is a top plan view of the carrier frame of illustrated in FIG. 1.

Referring to FIGS. 2, 3, 11 and 22, draw bar assembly 18 is a two stage tongue assembly that is described in greater detail below. Suffice it to say at this time that, among other components, assembly 18 includes a first tongue member 25 having first and second ends 150 and 151 and forming a first passageway 152. First tongue member 25 also forms an external surface 154. As best seen in FIGS. 3 and 11, first tongue member 25 is secured at its first end 150 to a central point of cross bar 13 via welding or some other suitable securing process.

Referring to FIGS. 2, 3, 8, 29, 30, 31 and 32, platform 24 is essentially a rigid flat bed member that is secured to a top surface of cross bar 13 and approximately half of first tongue member 25 proximate cross bar 13. Among other features, platform 24 forms a track runner 38 on a top surface which is reinforced on a platform undersurface (see FIG. 3) via supporting tracks 23 and 22 or in any other manner known in the art. A support extension member 47 extends rearward from platform 24 and includes an upwardly facing surface for supporting wheel 261 when the assembly is in the operating position. Pivot pin 34 extends through an opening in platform 24. Referring also to FIG. 4, track runner 38 forms an arc about pivot pin 34 having a radius dimension that is identical to the space dimension between pivot aperture 234 and roller assembly 44 on bar 14. Runner 38 is dimensioned so as to securely support the roller of assembly 44 in any position along the runner and thereby provide support to main frame bar member 14 there above.

Referring still to FIGS. 2 and 4, transport and operating implement locking brackets or latches 46 are also provided on the top surface of platform 24. A transport bracket 46 is generally spaced from pivot pin 34 along a line parallel to the length of first tongue member 25 while an operating bracket 46 is generally spaced from pin 34 on the side of first tongue member 25 opposite pin 34. Each bracket 34 is formed so as to securely receive and lock to latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35, 36 are off the ground, the entire main frame bar 14 and components attached thereto are supported by the pivot pin 34 and wheel assembly 44 and are moveable from the transport position illustrated in FIG. 9 to the operating position illustrated in FIG. 1 and to any intermediate position therebetween (see FIG. 7) by simply controlling cylinder 250 thereby rotating main frame bar 14 about pivot pin 34. As indicated above, when in either the transport or operating positions, latch assembly 45 and one of brackets 46 cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Figure 31:
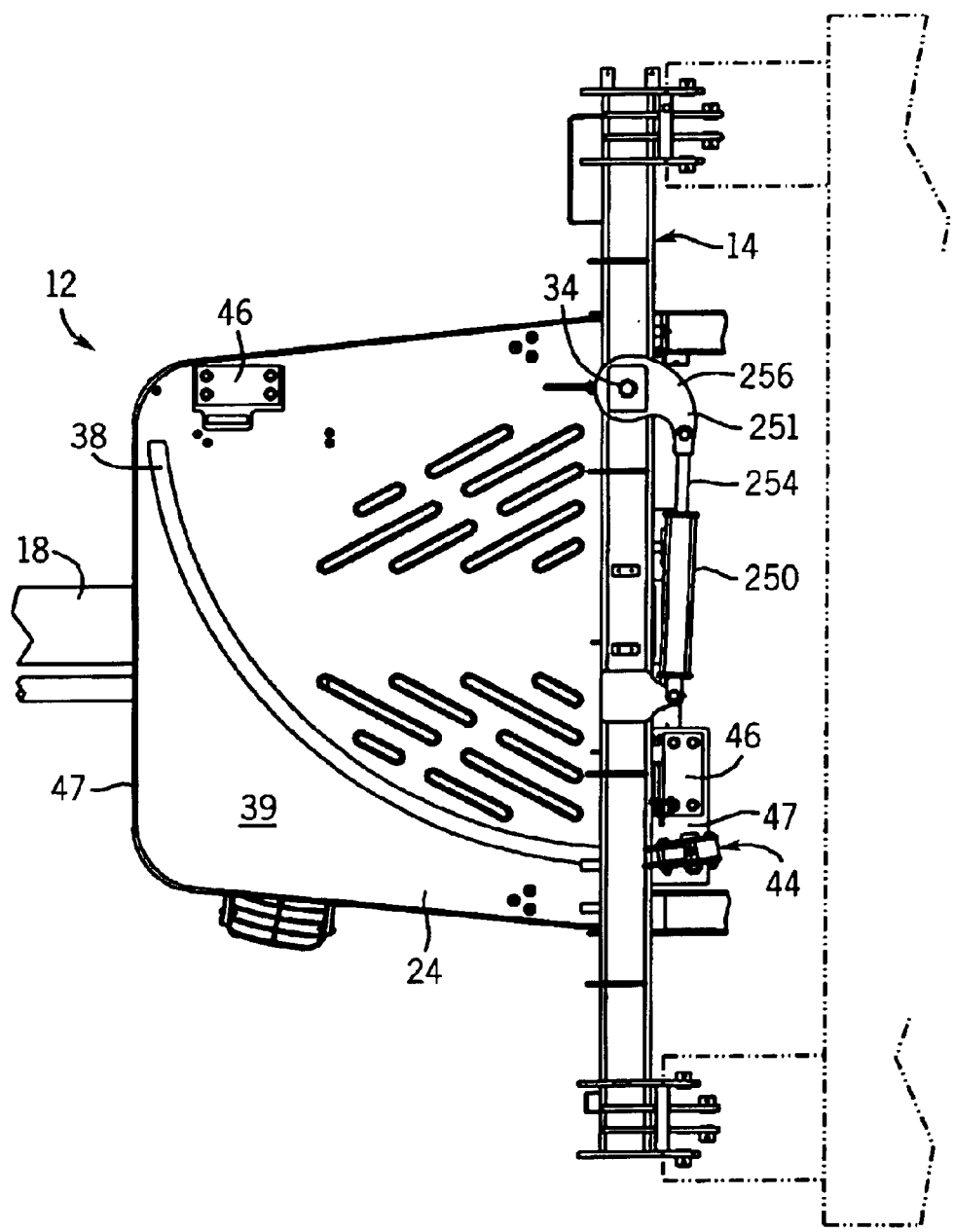
FIG. 31 is a top plan view of the main frame assembly with the carrier assembly shown in the operating position.
Figure 32:
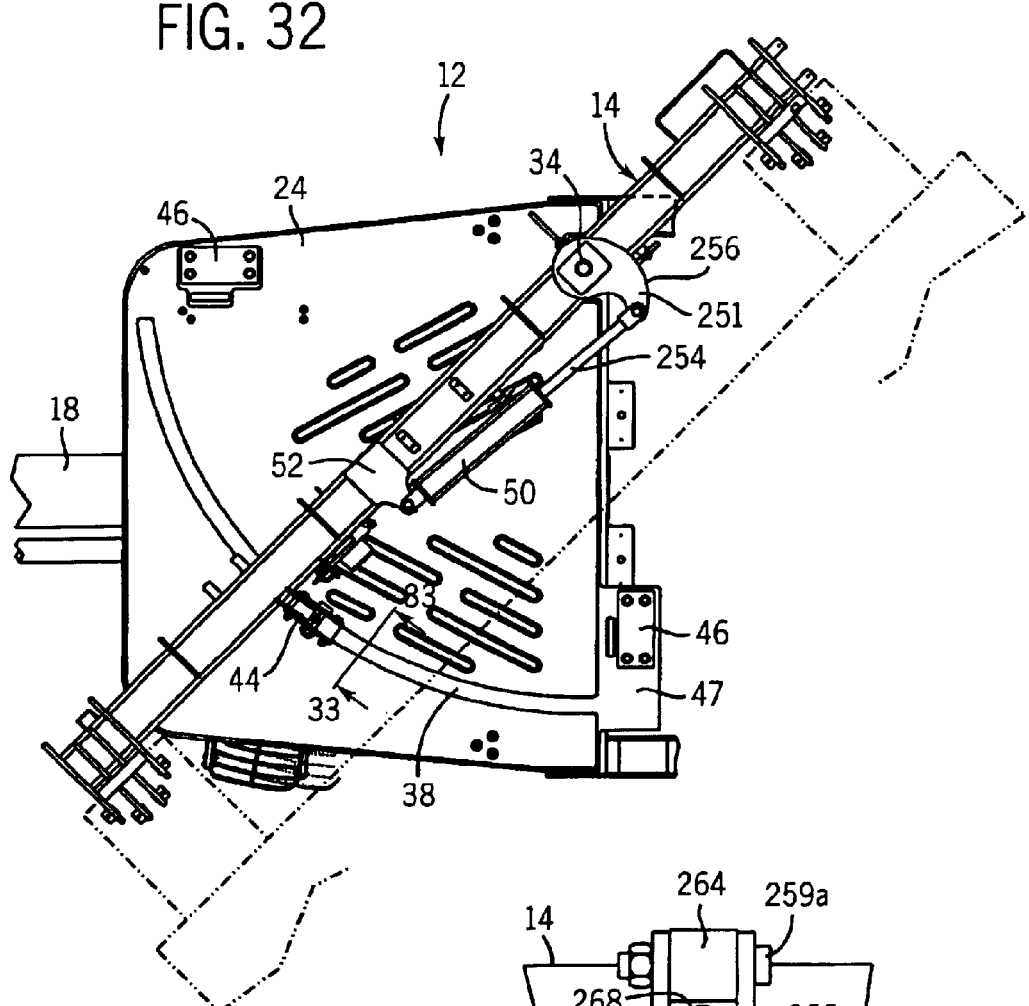
FIG. 32 is a top plan view of the main frame assembly with the carrier frame shown rotated midway between the operating and transport positions.

Referring to FIGS. 29 and 31, with bar member 14 in the operating position and adjacent a rear edge of platform 24, wheel assembly 44 extends back past the rear edge of platform 24. Support member 47 extends therebelow to support assembly 44.

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

Referring now to FIGS. 1, 9, 10 and 11, an exemplary two stage tongue assembly according to the present invention includes the first tongue member 25 described above, second and third tongue members 19 and 20, respectively, a hitch assembly 26 and first and second hydraulic tongue cylinders 50 and 52, respectively.

Figure 18:
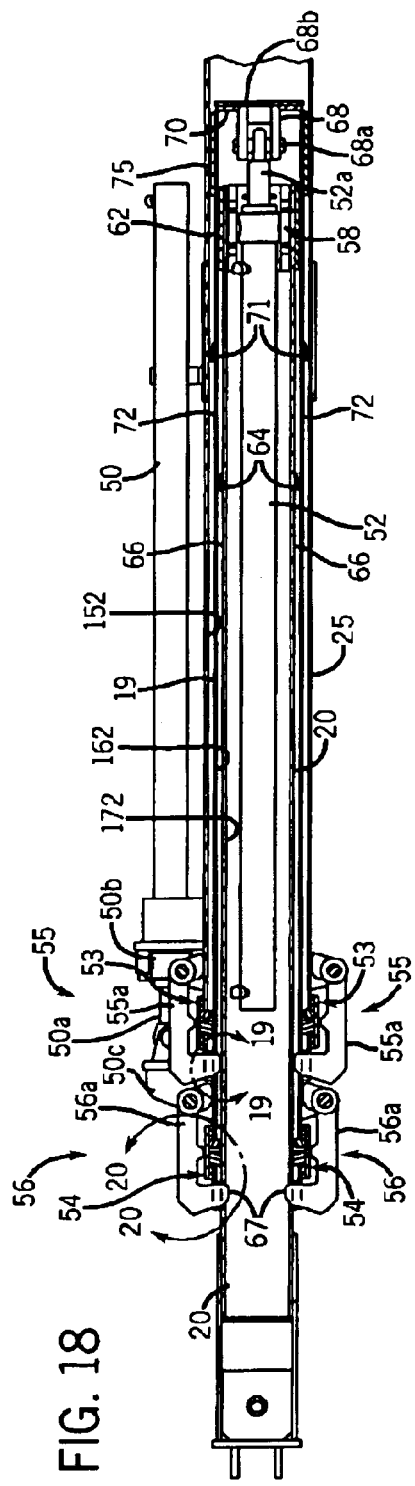
FIG. 18 is a horizontal cross-sectional view of the hitch assembly taken along line 18—18 of FIG. 15 with the hitch assembly in the retracted position.
Figure 22:
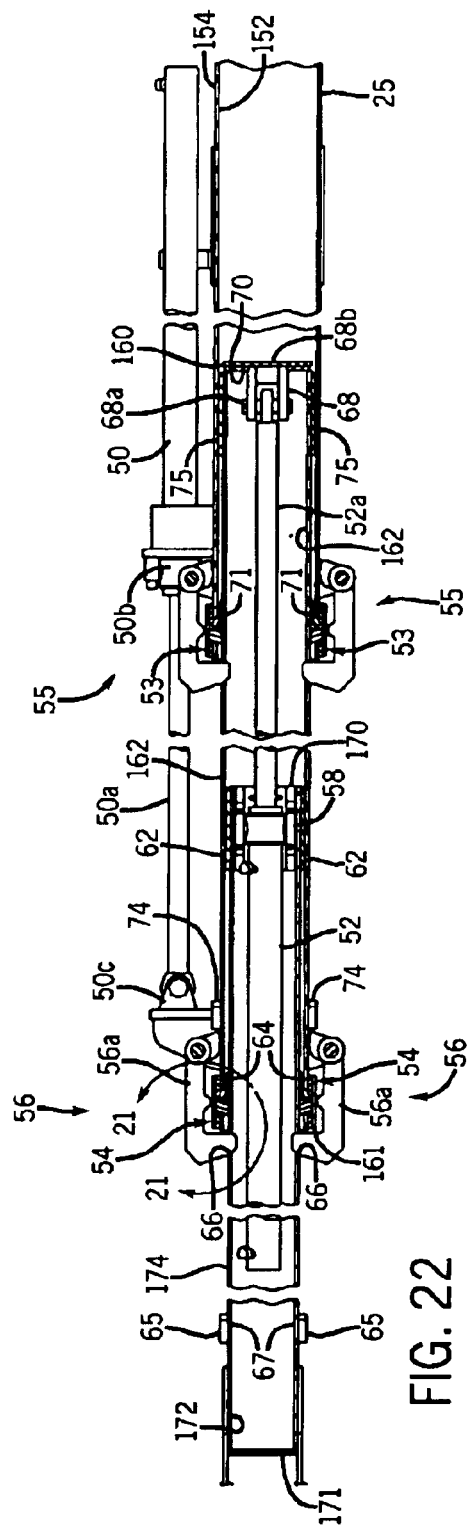
FIG. 22 is similar to FIG. 18, albeit with the tongue members shown in the extended position with the latches in a latched and locked position.
Figure 24:
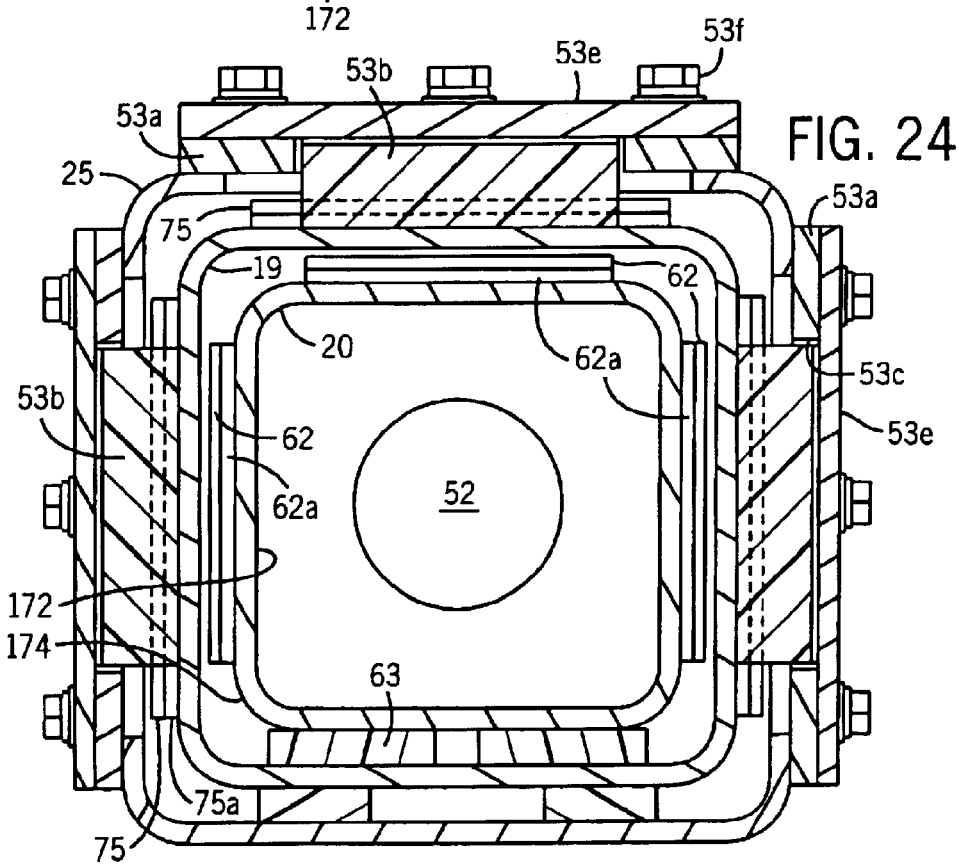
FIG. 24 is a cross-sectional view taken along lines 24—24 of FIG. 16.

Referring also to FIGS. 18, 22 and 24, as described above, first member 25 has first and second ends 150 and 151, an external surface 154, forms a first passageway 152 and is secured to a central point on cross bar 13. Second tongue member 19 has first and second ends 160 and 161, an external surface 164 and forms a second passageway 162 while third tongue member 20 has first and second ends 170 and 171, has an external surface 174 and forms a third passageway 172. Hitch assembly 26 is secured to the second end 171 of third tongue member 20. Attached to the two-stage tongue is a power cable control system 21 that retracts during implement operation and extends during transport.

Referring to FIGS. 12–14, 18 and 22–24, third tongue member 20 is dimensioned to be received within second passageway 162 with minimal clearance while second tongue member 19 is dimensioned to be received within first passageway 152.

Smooth sliding motion between tongue members 19 and 20 is aided by providing bearing pads 62 on the external surface 174 of first tongue member 20. To reduce the space between the external surface 174 and the surface which forms second passageway 162, shims 62a are provided between external surface 174 and the pads 62. The pads 62 and shims 62a are attached to external surface 174 on the top and the two vertical sides of third tongue member 20. In addition to pads 62, rails 63 are attached to the bottom of the external surface 174 of member 20 to further facilitate smooth sliding motion. Similarly, rails 80 are provided on the bottom external surface 164 of second tongue member 19 and shims 75a and bearing pads 75 are provided on each of the top external surface and the two vertical side external surfaces of second tongue member 19.

Referring to FIGS. 13, 20, 21, 23 and 24, bearing pad or aligning assemblies 54 (shown in an exploded view in FIG. 13) (which each also double as first extension stop members or assemblies) are positioned on the top and both vertical sides of second tongue member 19 and each include a bearing pad reinforcement plate 54a, a bearing pad 54b, shims 54d, retainer plates 54e and a plurality of bolts 54f. In addition, in FIGS. 20 and 21 a limiting member 54g is illustrated. Each of the bearing pad assemblies 54 is similarly constructed and therefore only one of the pad assemblies will be described in detail. Generally, the bearing pad reinforcement plate 54a is a square steel member which is welded or secured in some other manner to a corresponding external surface of member 19 at the second end 161 of member 19. A square opening 54c is cut into plate 54a and through an adjacent portion of second end 161. Composite bearing pad or bearing member 54b is dimensioned so as to be receivable within opening 54c. Where the assembly 54 includes a limiting member 54g the limiting member 54g and bearing pad 54b compliment each other and together fill the space defined by opening 54c with pad 54b facing the second end of tongue member 19 and member 54g facing away from the second end of member 19. Member 54b is formed of a wear resistant material while member 54g is formed of a rigid material.

With third tongue member 20 received inside the second passageway 162, composite bearing pads 54b are positioned in openings 54c so that internal surfaces thereof are very close to the external surface 174 of third tongue member 20. Shims 54d are provided on the outwardly facing surfaces of bearing pads 54b. Thereafter, retainer plates 54e are attached to the bearing pad reinforcement plates 54a with a plurality of bolts 54f.

Figure 20:
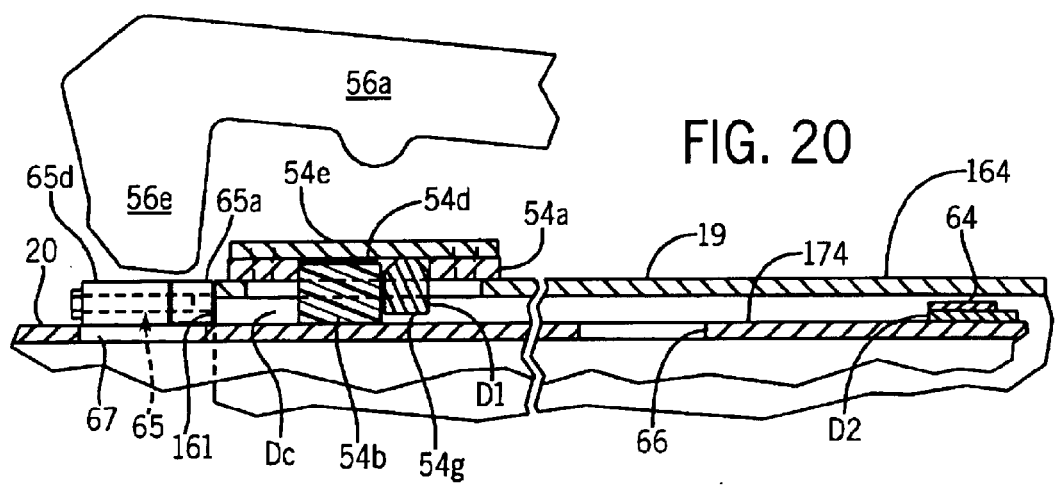
FIG. 20 is a cross-sectional view of the stops and latch slots taken along line 20—20 of FIG. 18, albeit with the latch in an unlatched position shown in the extended position.
Figure 21:
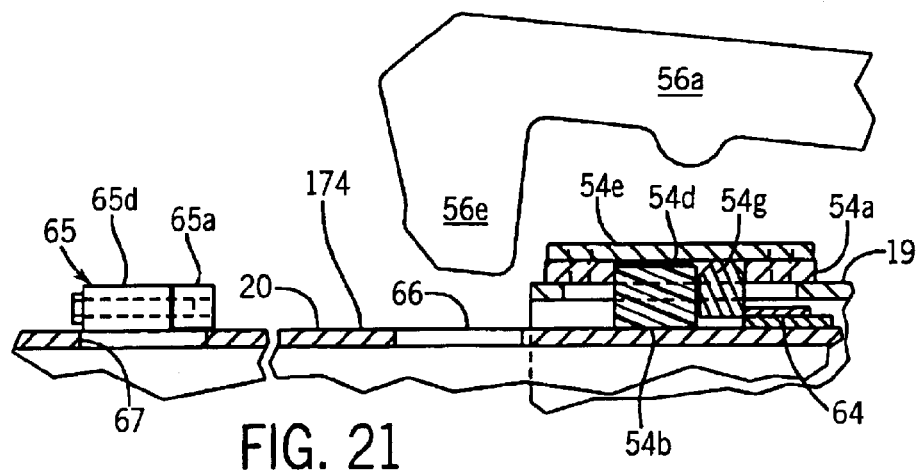
FIG. 21 is similar to FIG. 20, albeit taken along the line 21—21 of FIG. 22 with tongue members in an extended position.

Referring also to FIGS. 20 and 21, differently sized shims 54d can be swapped in and out of the assembly 54 until the spacing between external surface 174 and a corresponding facing pad 54b surface is ideal. The rectilinear limiting members 54g form first extension stop surfaces that face away from the second end of member 19 and that cooperate with other extension stop member surfaces (e.g., 64 in FIG. 21) on third tongue member 20 to limit extension of the third tongue member 20 from second tongue member 19 in a manner to be described below.

Figure 14:
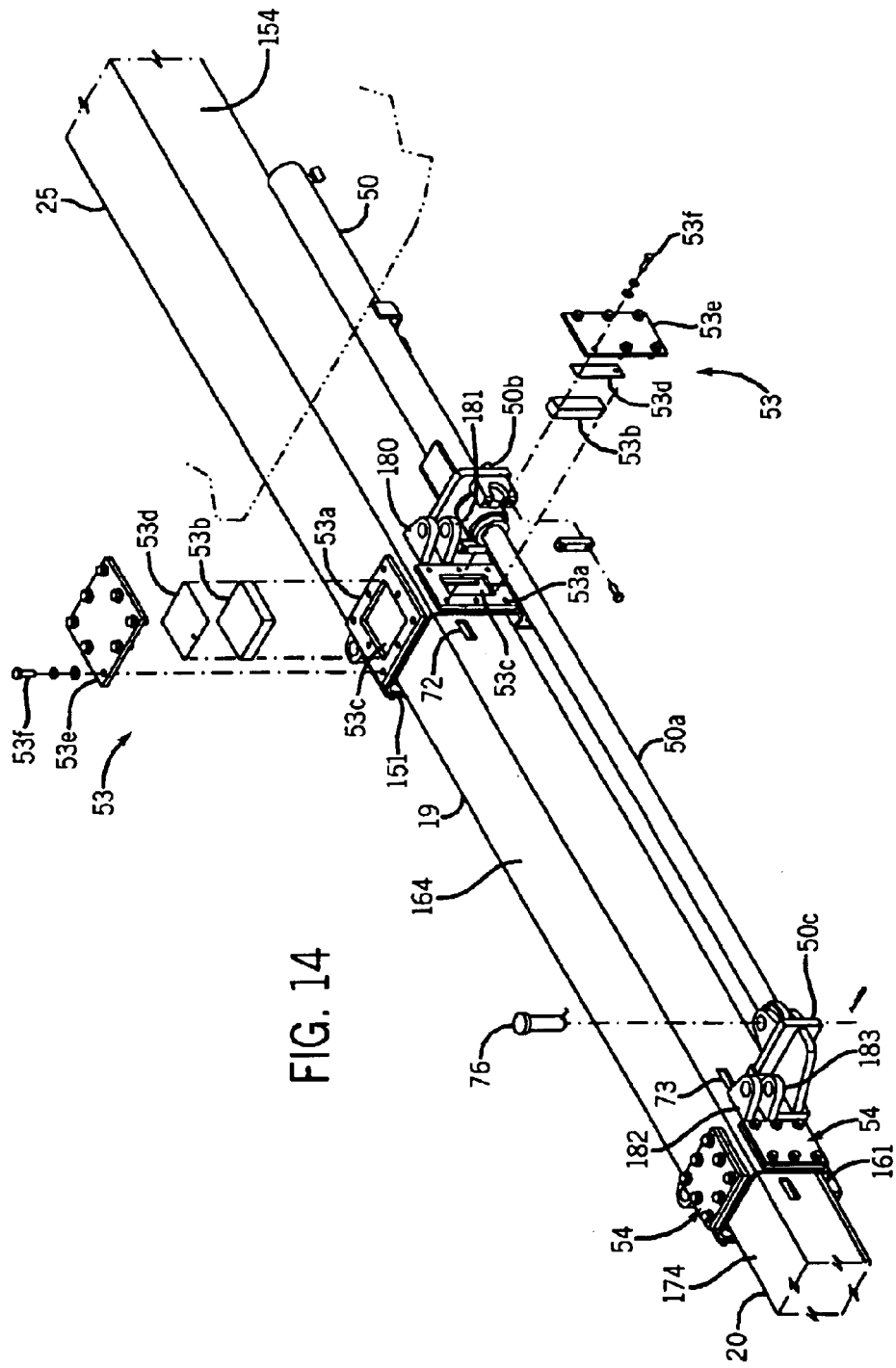
FIG. 14 is a partially exploded perspective view of the second and third tongue members of FIG. 13 and a first tongue member and external cylinder assembly.

Referring now to FIGS. 14 and 24, bearing assemblies 53 (that again also double as first extension stop members or assemblies) that are similar to the bearing assemblies 54 described above are also provided at the second end of first tongue member 25 on each of the vertical side walls and on the top wall to further facilitate smooth sliding of second tongue member 19 within first tongue member 25. Pad assemblies 53 are similar to the assemblies 54 described above and therefore will not be described again here in detail. It should suffice to say that each assembly 53 includes a bearing pad reinforcement plate 53a that receives a composite bearing pad 53b through an opening 53c and also includes shims 53d used to adjust spacing, that each assembly 53 may also include stop members (not illustrated) and that the shims 53d and pads 53b are held in place by retainer plates 53e and a plurality of bolts 53f.

Figure 12:
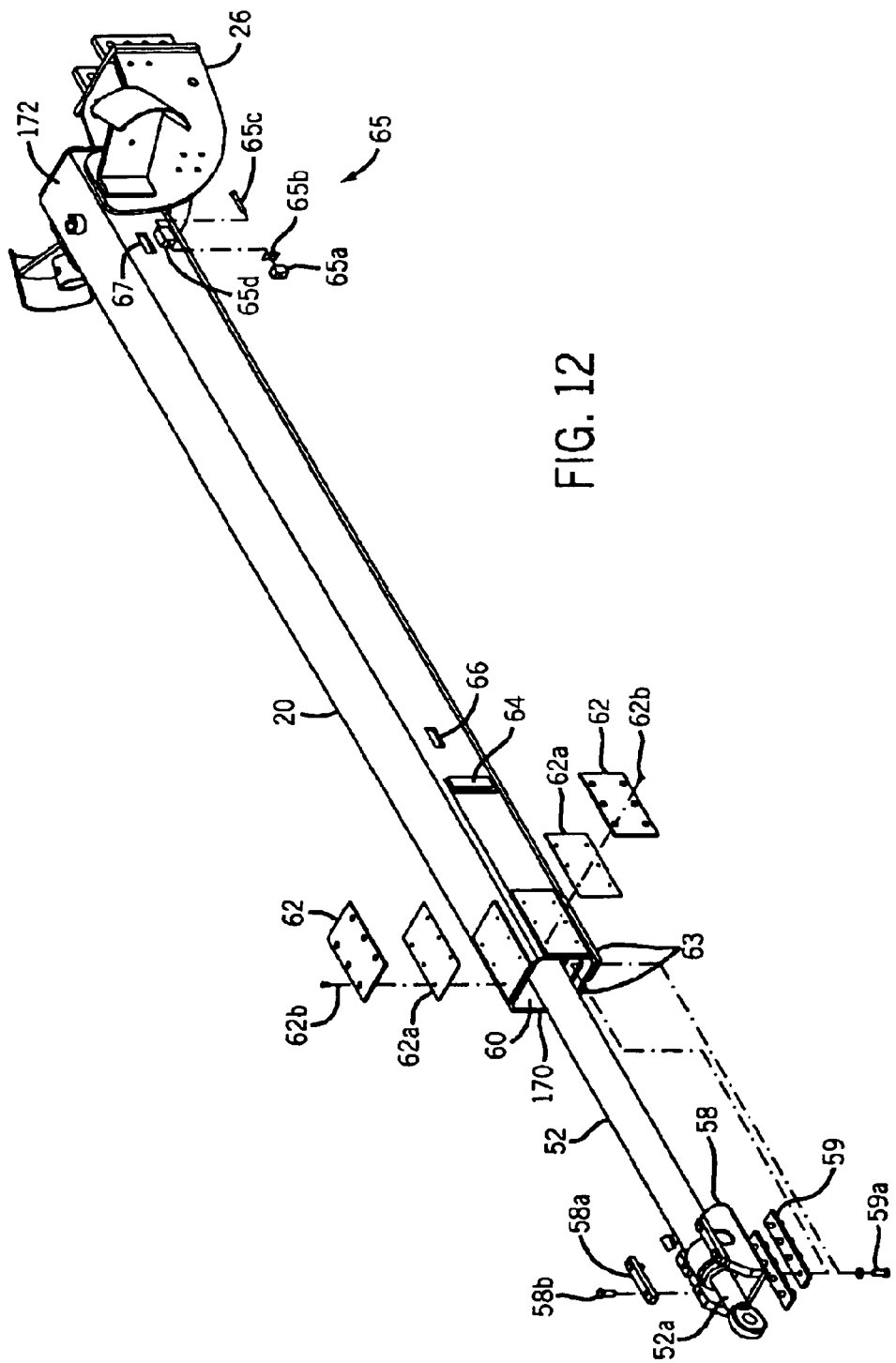
FIG. 12 is a partially exploded perspective view of a third tongue member and corresponding hydraulic cylinder rod and various assembly components.

Referring now to FIG. 12, third tongue member 20 forms a first pair of latch slots 66 (only one shown) proximate the first end of member 20, slots 66 formed in the opposing vertical side walls. Similarly, member 20 forms a second pair of latch slots or apertures 67 proximate the second end of member 67, a separate slot 67 formed in each of the vertical side walls of member 20. Furthermore, various stop members or stops are formed or secured to the vertical side wall external surfaces of member 20 to limit the maximum and minimum relative positions between members 19 and 20.

Figure 23:
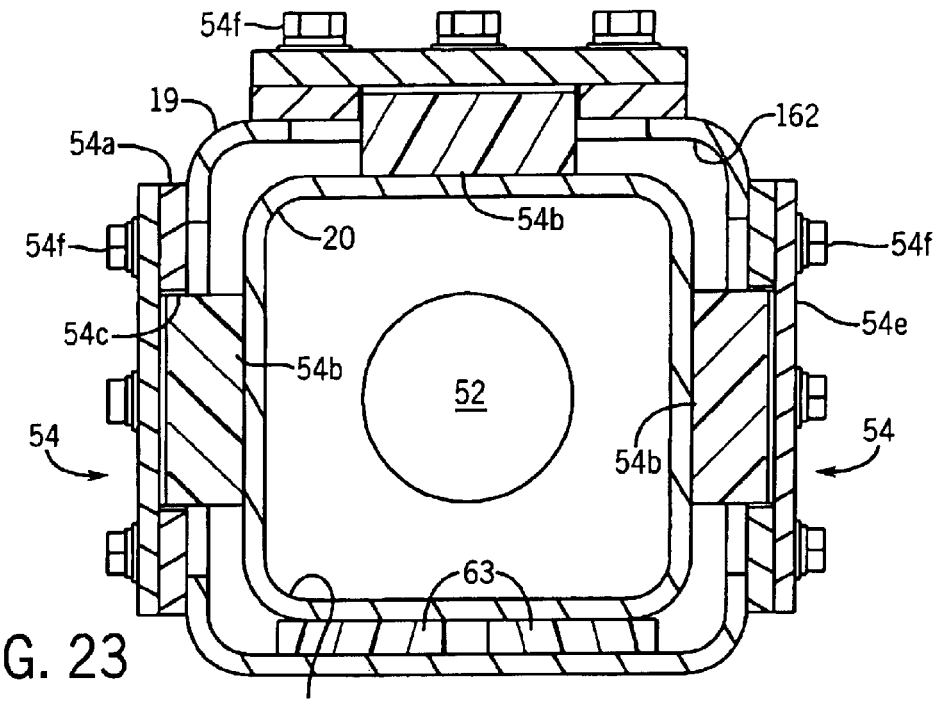
FIG. 23 is a cross-sectional view taken along line 23—23 of FIG. 16.

To this end, a pair of extension stops 64 (i.e., each being a second extension stop member or assembly) are attached to each vertical side wall of telescoping member 20 (only one stop 64 shown) proximate the first end 170 of member 20. As illustrated, each second extension stop member 64 is positioned between pad 62 and slot. Each second extension stop member 64 forms a second extension stop surface facing an adjacent slot 66. Referring to FIGS. 20, 21 and 23, with the clearance between adjacent internal and external surfaces of members 19 and 20, respectively, defining a clearance dimension Dc, the bearing pad 54b and member 54g extends first dimension D1 and member 64 extends a second dimension D2 from the external surface of member 20 where each of the first and second dimensions is less than the clearance dimension and the sum of the first and second dimensions is greater than the clearance dimension Dc such that, as seen in FIG. 21, when member 20 is extended from member 19, the maximum extension is limited by the stop surfaces.

Although not illustrated, each of the second extension stop members 64 can be detached from tongue member 20 and moved within a range along the length of member 20 between pad 62 and slot 66 such that the distance between the second extended stop surface on member 64 and the slot 66 can be adjusted. In at least one embodiment stop members 64 are secured to tongue member 19 via bolts (not illustrated). By making the position of members 64 adjustable, the positions of members 64 can be altered to make sure that when the first and second extension stop surfaces contact, end 55e of latch 55a is aligned with slot 66 as seen in FIG. 21. By providing adjustable stop members as described above, manufacturing tolerances for the tongue members and slots can be relaxed thereby reducing manufacturing costs.

In addition, retraction stop assemblies 65 are positioned on the external surfaces of each vertical side wall of member 20 (only one assembly 65 shown) proximate the second end of member 20. Assembly 65 includes a retraction stop 65a, a shim 65b, a bolt 65c and a stop mounting bracket 65d. Stop mounting bracket 65d is secured to its corresponding vertical side of member 20 just below slot 67. A mounting aperture (not separately numbered) extends through bracket 65d along a direction parallel to the length of tongue member 20. To secure stop 65a and shim 65b to bracket 65d, bolt 65c is placed through the aperture formed by the bracket 65d and is received by shim 65b and stop 65a in a threaded fashion.

Shims 65b come in various thicknesses (i.e., at least first and second thicknesses) and can be swapped in and out for each other to adjust relative positions of the first and second tongue members when the members are in the retracted position. This adjustability is important so that locking members described below can be aligned with latch slots 64 and 67 (see FIG. 12) to lock the assembly in various configurations as described in more detail below.

Figure 13:
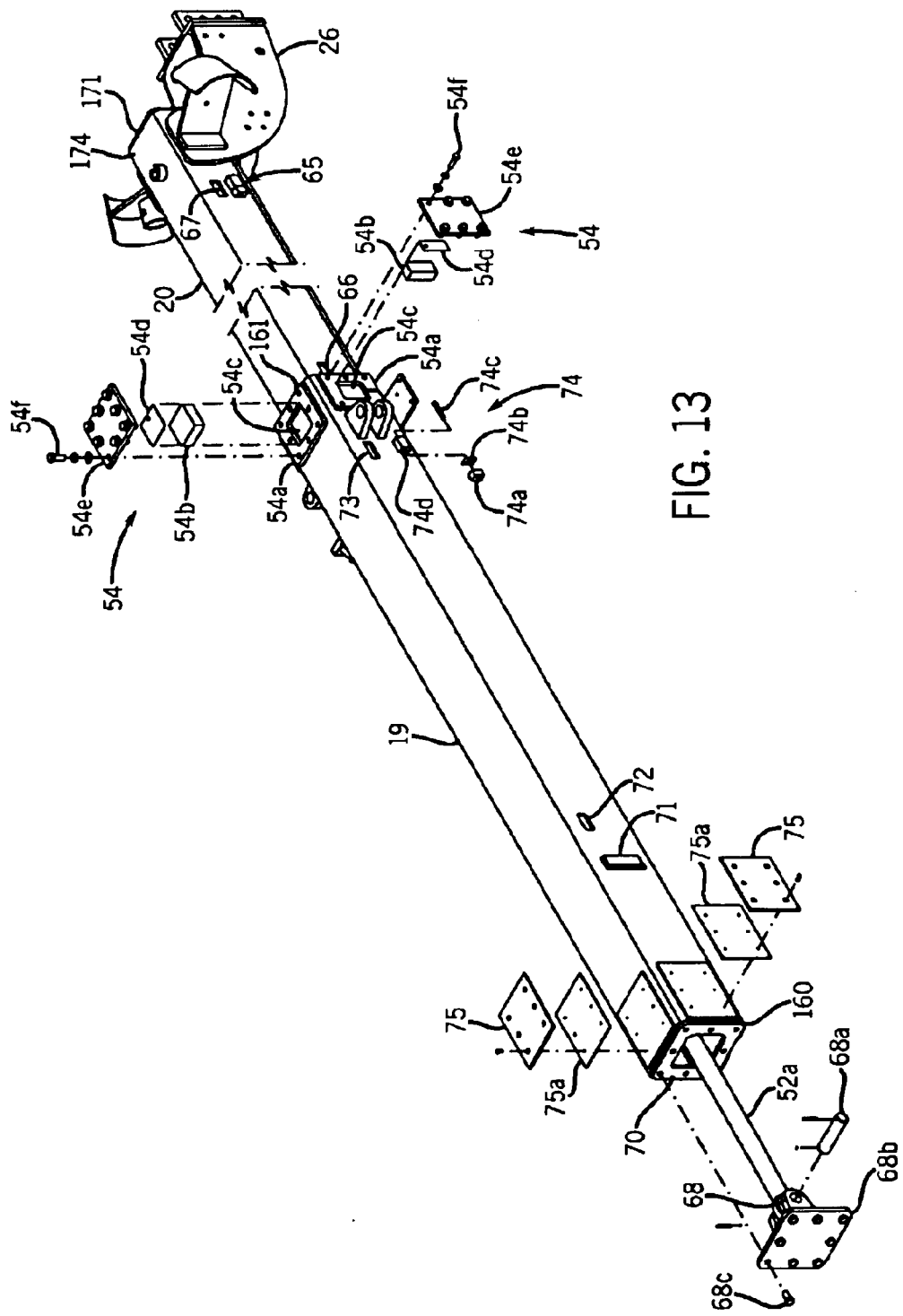
FIG. 13 is a partially exploded perspective view of the third tongue member of FIG. 12 and a second tongue member both that receives the third member and other assembly components.

Referring now to FIG. 13, second tongue member 19 forms first and second pairs of latching slots 72, 73 (only one slot of each pair is shown), respectively, that are similar to the slot pairs 66 and 67 illustrated in FIG. 12 and described above. To this end, the first slot pair 72 is provided with one slot in each of the vertical side walls proximate the first end of member 19 while pair 73 includes a separate slot 73 in each of the vertical side walls of member 19 at the second end of member 19. In addition, limiting means similar to limiting stops 64 and assemblies 65 illustrated in FIG. 12 are provided on the vertical side wall external surfaces of member 19 including a pair of extension stops 71 and a pair of retraction stop assemblies 74 mounted at the first and second ends of member 19, respectively. Assemblies 74 are similar to assembly 65 described above and therefore will not be described here in detail. Suffice it to say that each assembly 74 includes each of a retraction stop 74a, a shim 74b, a screw 74c and a mounting bracket 74d. Operation of the stops, stop assemblies, latch slots and additional latching components will be described in greater detail below.

Referring once again to FIGS. 12, 18 and 22–24, first cylinder 150 includes a rod 50a that extends therefrom to a distal end and is double acting meaning that the cylinder 50 is plumbed so that the rod 50a can be forced to either extend or retract. Similarly, second cylinder 52 includes a rod 52a having a distal end and that is double acting. Second hydraulic cylinder 52 is generally mounted within the third passageway 172 formed by third tongue member 20. To this end, a cylinder mounting bracket 58 is secured to cylinder 52 and is mounted to the internal surface that forms passageway 172 adjacent an opening 60 of member 20 at the first end 170 thereof. The bracket 58 is mounted to the internal surface of passageway 172 via mounting bars 58a and a plurality of bolts 58b. Spacers 59 may be provided between bracket 58 and the internal surface of passageway 172 to center rod 52a within passageway 172.

Referring now to FIGS. 12 and 13, with third tongue member 20 received inside the second passageway 162 formed by second tongue member 19 and the distal of end rod 52a extending from the first end 160 of second tongue member 19, a square end plate 68b can be secured to the distal end of rod 52a via a clevis 68 and corresponding pin 68a. Thereafter, end plate 68b is secured to the first end 160 of second tongue member 19. In the exemplary and illustrated embodiment, a square end plate 70 is provided on first end 160 which can be used to connect end plate 68b thereto via bolts 68c. Thus, it should be appreciated that when rod 52a is extended, third tongue member 20 is forced out the second end 161 of member 19 thereby extending the subassembly including members 19 and 20.

Referring now to FIG. 14, first cylinder 50 is generally mounted to the external surface 154 of first tongue member 24 via bracket 50b proximate the second end 151 of member 24 so that the distal end of rod 50a extends past second end 151. The distal end of rod 50a is secured proximate the second end 161 of second tongue member 19 between assembly 54 and slot 73. As above, the distal end of rod 50a can be secured via a clevis 50c and pin 76. Thus, it should be appreciated that when rod 50a is extended, cylinder 50 forces second tongue member 19 from within first tongue member 25 thereby extending the subassembly including members 19 and 25.

More broadly, referring now to FIGS. 10–14, 18 and 22, it should be appreciated that by placing at least one of the hydraulic cylinders outside the passageways formed by the expandable tongue members, at least a two stage tongue assembly 18 can be configured wherein the cylinders have dedicated spaces and do not interfere with each other. Thus, upon retraction and as illustrated best in FIG. 18, cylinder 52 essentially completely occupies passageway 172 but, nevertheless, cylinder 50 can be accommodated outside the tongue member defined passageways. Importantly, providing the configuration illustrated where cylinder 50 is "off-load" centered is only a viable option once it is recognized that, by providing multiple cylinders, the load on each cylinder, including off-load center cylinders (e.g., 50), is substantially reduced. Thus, because the load on the externally mounted cylinder is reduced by providing several cylinders, an overall cylinder life cycle comparable to prior single stage cylinder life cycles can be achieved.

Figure 10:
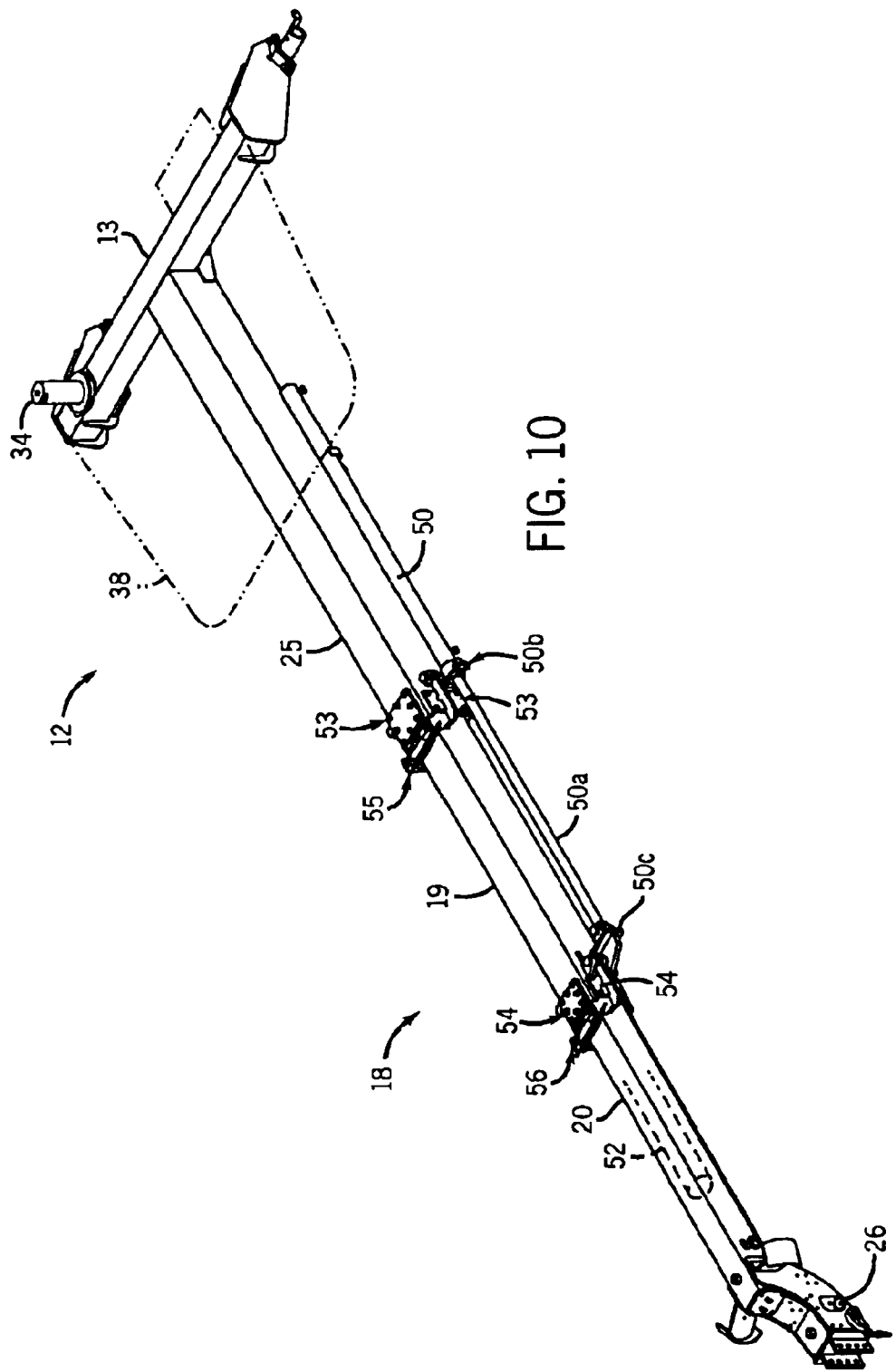
FIG. 10 is a perspective view of components that, in part, form the carrier frame assembly used with the configuration of FIG. 1 in an extended or transport position.

Referring now to FIG. 10, it should also be appreciated that additional stages may be added to tongue assembly 18 by providing additional externally located hydraulic cylinders, a separate cylinder for each of the additional stages. For example, in FIG. 10, if a forth stage were added, the third hydraulic cylinder may be secured to the top external surface of second tongue member 19 with the additional tongue member positioned between members 19 and 20. Additional stages are contemplated by providing additional hydraulic cylinders on other sides of the tongue assembly 18.

Referring to FIGS. 12, 13, 14, 18 and 22, it should also be appreciated that when third tongue member 20 is retracted into second tongue member 19, the second end 161 of second tongue member 19 abuts stop assemblies 65 and retraction movement is limited thereby. Similarly, when second tongue members 20 is retracted into first tongue member 25, the second end 151 of first tongue member 25 abuts stop assembly 74 and retraction movement is limited thereby.

Moreover, referring also to FIGS. 20 and 21, it should be appreciated that when third tongue member 20 is extended from second tongue member 19, eventually stop members 64 contacts stop member 54g and extension movement is limited thereby. Similarly, although not illustrated, member 71 (see FIG. 13) a stop member similar to member 54g cooperate to limit extension of second tongue member 19 from first tongue member 25.

Referring now to FIG. 14, in additional to the components described above that form parts of first and second tongue members 25 and 19, respectively, latch mounting extensions for mounting locking latches that cooperate with the latch slots (e.g., 73, 72, etc.) described above are provided at the second ends 151 and 161 of tongue member 25 and 19, respectively. More specifically, referring also to FIGS. 15–17 a first latch mounting assembly includes first and second outwardly extending members 180 and 181 that are positioned adjacent assembly 53 on the vertical side wall of tongue member 25 to which hydraulic cylinder 50 is attached. Extensions 180 and 181 have vertically aligned openings (not numbered) and define a space therebetween for receiving a latch member 55a (see FIG. 15). Similar latch mounting extensions extend from the other vertical wall of tongue member 24 for receiving a second latch member 55a that can be seen in FIG. 16.

Figure 16:
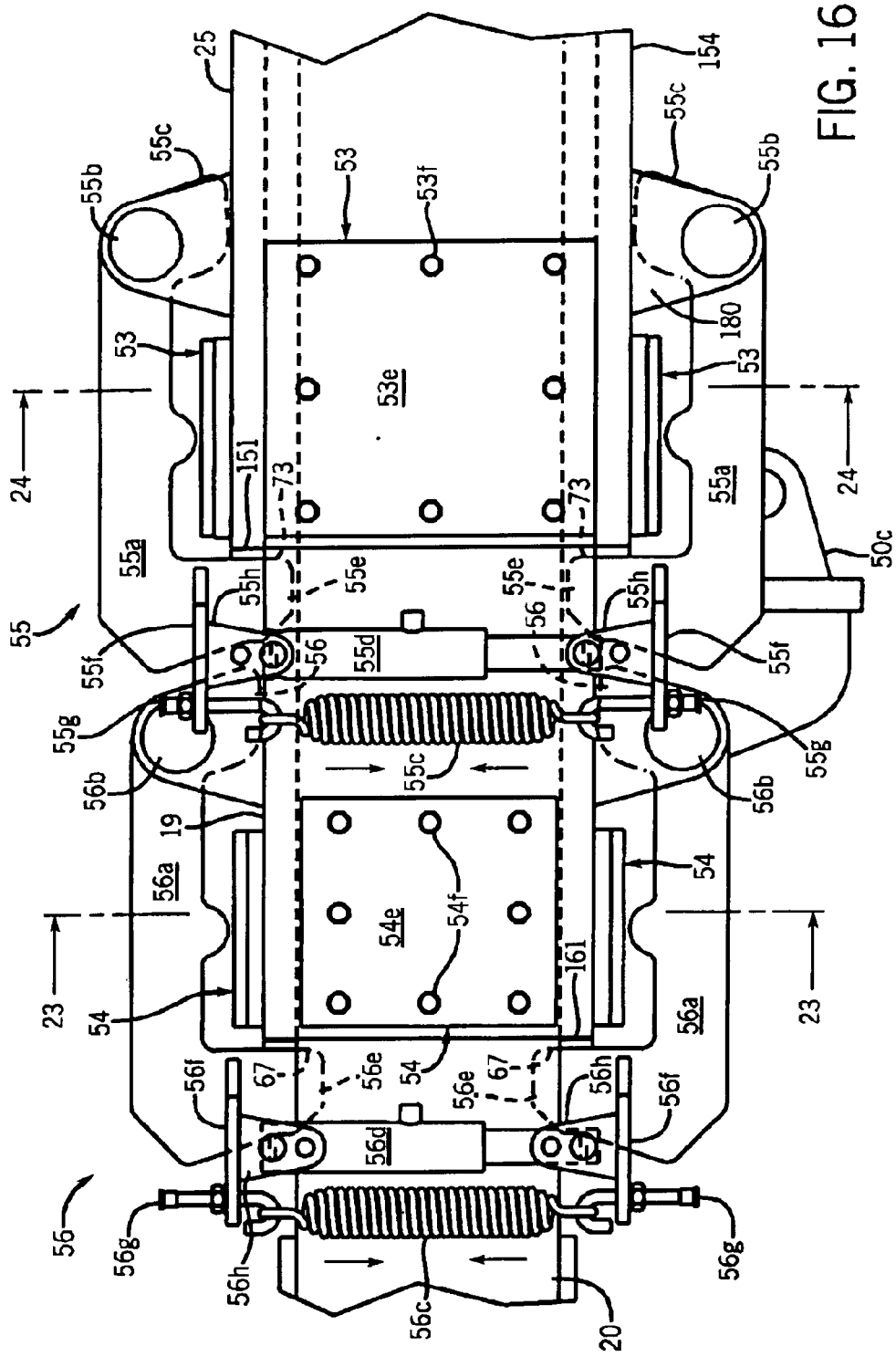
FIG. 16 is a top plan view of the latch assemblies of FIG. 15 in a latched position.
Figure 17:
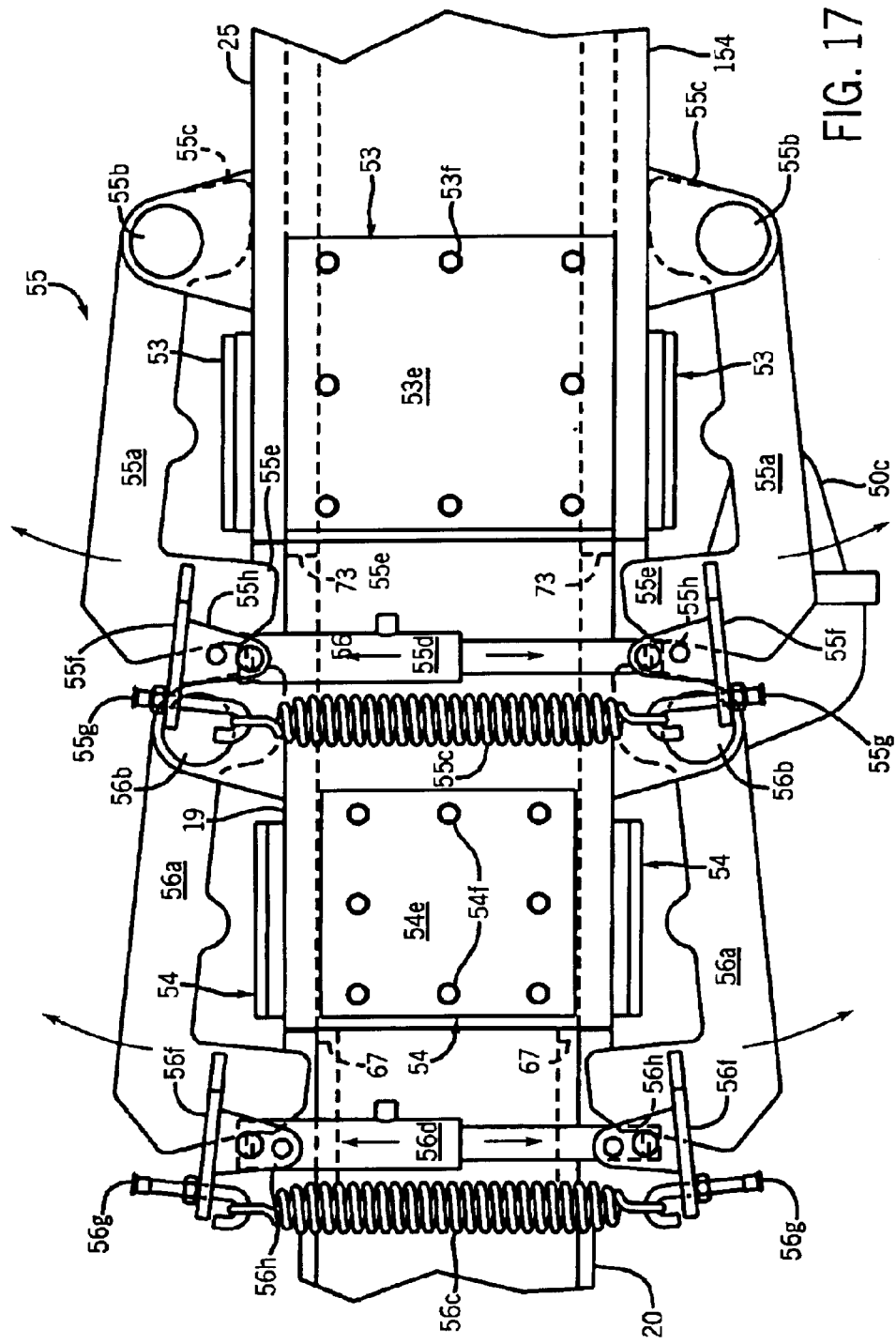
FIG. 17 is similar to FIG. 16, albeit with the latch assemblies in an unlatched position.

Referring still to FIG. 14, two latch mounting members 182 and 183 extend outwardly from the vertical side wall to which the distal end of rod 50a is attached proximate second end 161 of member 19. Members 182 and 183, like member 180 and 181 form openings that are vertically aligned and form a space therebetween for receiving a latch member 56a as illustrated in FIGS. 16 and 17. Once again, latch mounting members like members 182 and 183 are provided on the other vertical side wall of second tongue member 19.

Importantly, when second member 19 is received within first member 25, the space defined by members 180 and 181 is aligned with each of slots 72 and 73 defined by second tongue member 19. Similarly, the space defined by the mounting members extending from the other vertical side wall of first tongue member 25 are similarly aligned with latch slots formed in the other vertical side wall of member 19. Moreover, the spaces defined by member 182 and 183 and similar members extending from the other side wall of member 19 are aligned with latch receiving slots formed by third tongue member 20 (e.g., see slots 67 and 72).

Figure 15:
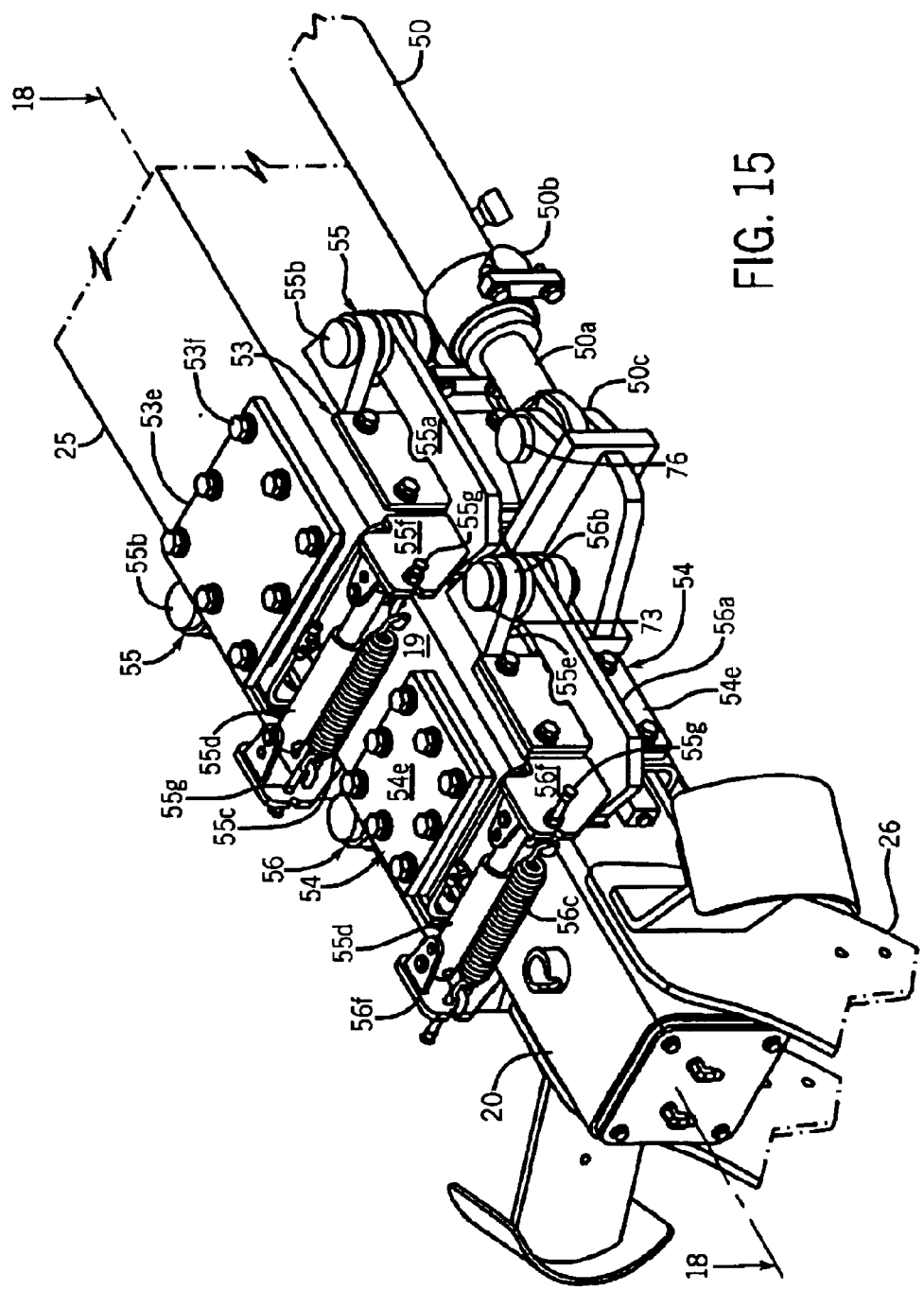
FIG. 15 is a detailed perspective view of a portion of the hitch assembly of FIG. 11 with the tongue members in the retracted position.

Referring now to FIGS. 12–22, and more specifically referring to FIG. 15, two separate latch assemblies 55 and 56 are illustrated that are mounted to the second ends 151 and 161 of the first and second tongue members 25 and 19, respectively. Generally speaking, each of the latch assemblies 55 and 56 is similarly constructed and operates is similar fashion and therefore, in the interest of simplifying this explanation, only latch assembly 55 will be described here in detail. To this end, latch assembly 55 includes first and second latches 55a, pivot pins 55b, a biasing spring 55c, a one-way hydraulic cylinder 55d and first and second extension plates 55f. Each of the latches 55a, pins 55b and plates 55f are similar in construction and operation and therefore, unless indicated otherwise, only one of each of those components will be described here.

Referring still to FIG. 15 and, more specifically, the latch 55a illustrated therein, and, also referring to the same latch 55a in FIG. 17, latch 55a has several components including a body component identified by number 55a, a latch tip 55e and a latch stop 55i. Tip 55e and stop 55i are integral with base member 55a and extend to the same side thereof, tip 55e extending a greater distance than stop 55i. At the junction between stop 55i and base member 55a, an opening (not numbered) is provided through which a bolt or securing pin 55b can be passed when latch 55a is mounted between mounting members 180 and 181 (see also FIG. 14).

Plate 55f is a flat member that is secured to latch tip 55e about half-way along the length of tip 55e and extends at a right angle thereto. A cylinder mounting member 55h extends in the same direction as tip 55e from the top end of plate 55f. An adjustable J hook 55g is mounted proximate the top end of plate 55f so that the hook member extends in the direction that member 55h extends (i.e., in the direction of tip 55e).

Referring still to FIGS. 14–17, latch 55a is dimensioned such that when latch 55a is mounted between extensions 180 and 181 via bolt or pin 55b with member 55a extending toward second tongue member 19, tip 55e extends past second end 151 of first tongue member 25. Plate 55f is dimensioned such that the top end of plate 55f extends above second tongue member 19 and so that when a spring 55c is mounted between opposed J hooks 55g and when cylinder 55d is mounted between members 55h, each of the spring 55c and cylinder 55d clear the top wall of second tongue member 19. Stop 55i is dimensioned such that, when latch 55a is mounted between members 180 and 181, while latch 55a can rotate about pin 55b, after a small rotational arc, stop 55i contacts the external surface of first tongue member and further rotation is limited.

As indicated above, the second latch assembly 56 is similar in form and function to assembly 55 except that assembly 56 is mounted to the second end 161 of second tongue assembly 19 so that latch tips extend past second end 161. To this end, assembly 56 includes third and fourth latch members 56a, pins 56b, spring 56c, latch hydraulic cylinder 56d, plates 56f, J hooks 56g and extensions 56h. Each latch 56a has a base member, a stop 56i and a latch tip 56e, the base member, stop and tip configured in a manner essentially identical to the latches 55a described above.

Referring still to FIGS. 16 and 17, in operation, with the latch cylinders 55d and 56d retracted, corresponding latches 55a and 56a are pulled inwardly by springs 55c and 56c as illustrated in FIG. 16. Referring also to FIG. 18, when the tongue assemblies 19 and 20 are in their retracted positions, latch tips 55e and 56e are aligned with latch slots 73 and 67 (see also FIGS. 13 and 14) and are received therein. However, when latch cylinders 55d and 56d are extended, the cylinders overcome the force of springs 55c and 56c driving latch tips 55e and 56e from slots 73 and 67, respectively. This extended latch cylinder position is illustrated in FIG. 17. When the latch assemblies 55 and 56 are in their extended or unlocked positions, tongue mounted cylinders 50 and 52 may be extended to drive second and third tongue members 19 and 20 in to their extended positions as illustrated in FIG. 22. Once members 29 and 20 are in their extended positions, latch cylinders 55d and 56d may be "de-energized" so that they are compressed by the force of springs 55c and 56c thereby causing latch tips 55e to be received within recesses 72 and 66, respectively.

Figure 19:
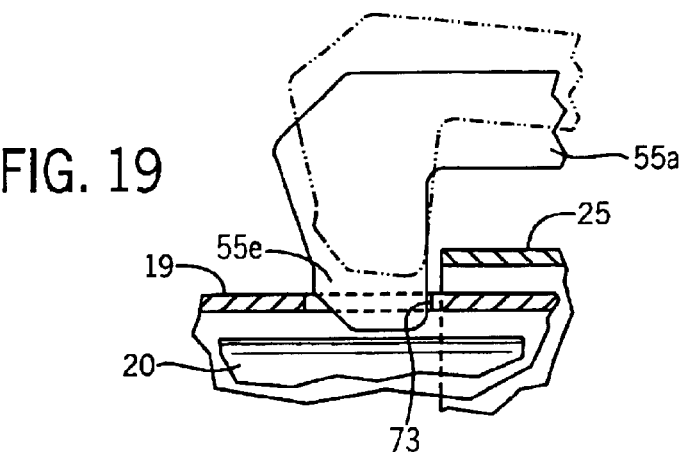
FIG. 19 is a cross-sectional view of a latch taken along the line 19—19 of FIG. 18.

Referring to FIG. 19, movement of latch tip 55e from aperture 73 is illustrated. In FIG. 20, movement of latch tip 56e from aperture 67 is illustrated. In FIG. 21, alignment of latch tip 56e with slot 66 after extension of third tongue member from second tongue member 19 is illustrated.

Referring again to FIGS. 12, 13 and 14, shims 65b and 74b and other components that comprise assemblies 54 and 53 can be adjusted to aid in aligning the latch tips 55e and 56e with corresponding latch slots (e.g., 66, 67, etc.).

Figure 25:
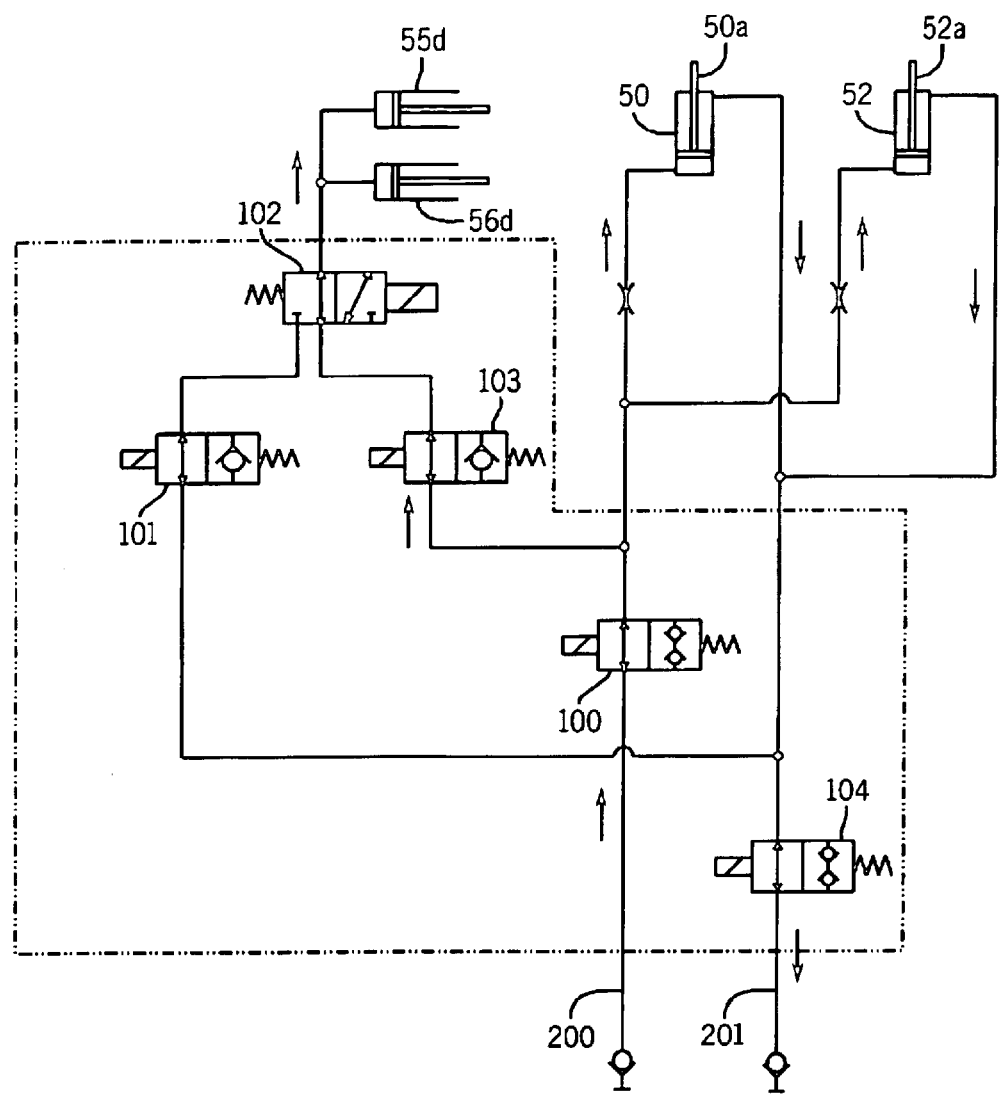
FIG. 25 is a schematic diagram of a hydraulic control assembly used to control the configuration of FIG. 1 at an instant in time when each of the latch and tongue cylinder rods are being driven toward extended positions.

Referring now to FIG. 25, an exemplary schematic diagram illustrating the plumbing used to link each of the latch cylinders 55d and 56d and the first and second tongue cylinders 50 and 52 is illustrated. While not illustrated, a hydraulic reservoir and pump is linked to first and second hydraulic system ports 200 and 201, respectively. The pump is capable of pumping hydraulic fluid in either direction through the illustrated system. The system includes five solenoid controlled valves 100, 101, 102, 103 and 104, cylinders 55d, 56d, 50 and 52 (including rods 50a and 52a) and a plurality of hydraulic lines that link the system together. Port 200 is linked to valve 100 which in turn is linked to extension ports of each of the first and second tongue cylinders 50 and 52, respectively. Each of cylinders 50 and 52 is an orificed two-way hydraulic cylinder and therefore also includes a retract port. Each retract port is linked to valve 104 which in turn leads to port 201. Thus, cylinders 50 and 52 are linked in parallel in the illustrated system.

Referring still to FIG. 25, the output of valve 100 is also linked to valve 103 and the output of valve 103 is linked to a first of two inputs of two-way solenoid valve 102. Similarly, the output of value 104 is linked to the input of solenoid valve 101 and the output valve 101 is linked to the second input of two-way value 102. The single output of valve 102 is linked to each of non-orificed one-way cylinders 55*d* and 56*d*. Thus, each of cylinders 55*d* and 56*d* are in parallel with cylinders 50 and 52. Orificed cylinders are simply cylinders that, as the label implies, bleed off some hydraulic fluid when first driven to change rod position whereas non-orificed cylinders have no bleeding characteristics and therefore top-out or reach their extended positions relatively quickly. Thus, because all four cylinders 55*d*, 56*d*, 50 and 52 are linked in parallel, when hydraulic fluid is provided through either of valve 100 or 104, the fluid first causes cylinders 55*d* and 56*d* to completely top-out and thereafter causes movement in cylinders 50 and 52 to move rods 50*a* and 52*a*, respectively.

Figure 26:
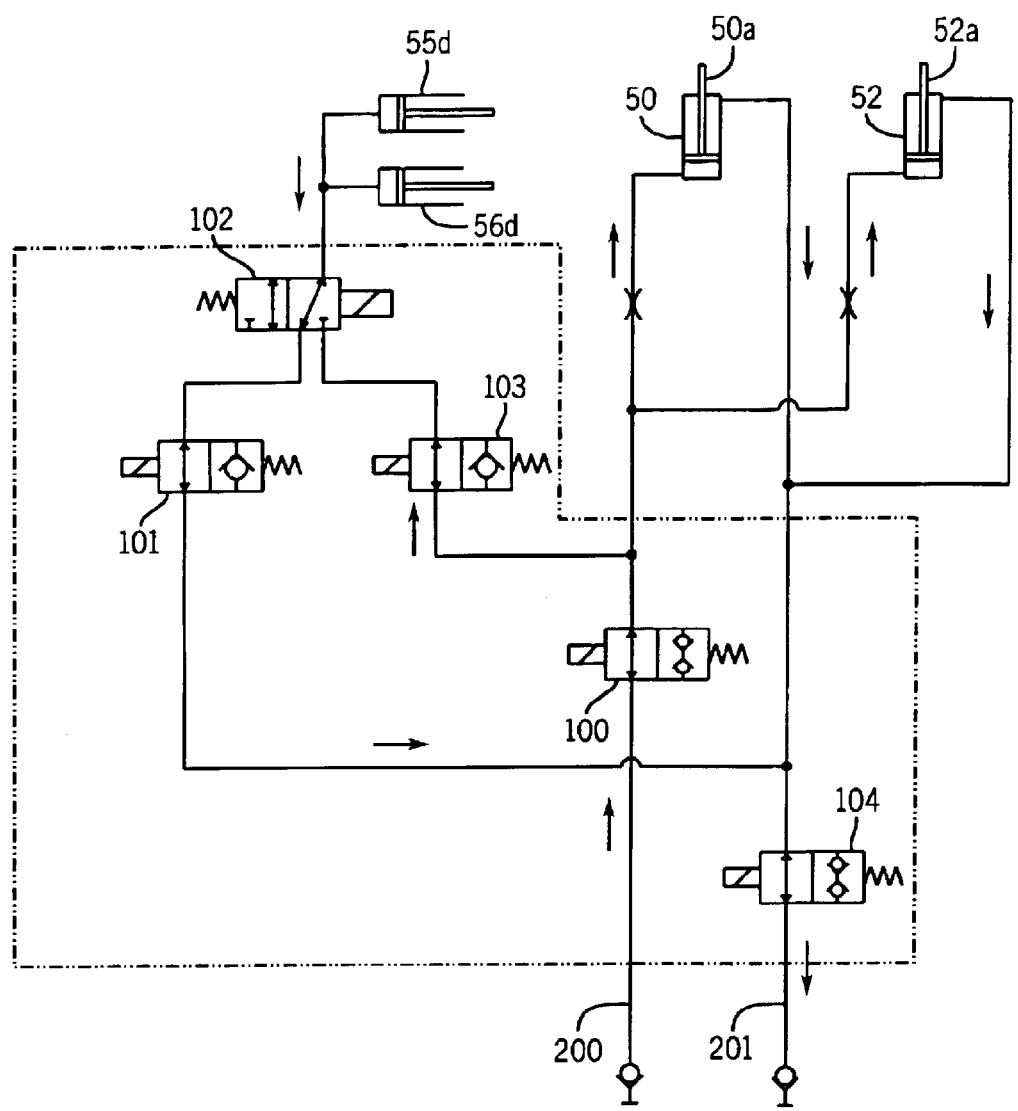
FIG. 26 is similar to FIG. 25, albeit at an instant in time when the tongue cylinder rods are being driven toward the extended position and with the latch cylinder pressure released so that the latches are forced into locking positions.

Referring still to FIG. 25 and also to FIG. 16, assuming that tongue assembly 18 is in a completely retracted and locked position, in order to unlock the latch assemblies 55 and 56 and extend assembly 18, hydraulic fluid is pumped into the system via port 200 with each of valves 100, 101, 103 and 104 open and with valve 102 open and linking valve 103 to cylinders 55*d* and 56*d*. In this case, because cylinders 55*d* and 56*d* are not orificed, the fluid causes cylinders 55*d* and 56*d* to top-out and completely extend overcoming the force of springs 55*c* and 56*c* to drive latches 55*a* and 56*a* to the unlocked positions illustrated in FIG. 17. Thereafter, after cylinders 55*b* and 56*b* top out, the fluid being pumped into port 200 is provided to cylinders 50 and 52 thereby causing those cylinders to extend and drive corresponding tongue members toward the extended positions. Upon reaching the extended positions, stop members 64, 71 and members 54*g* limit further extension (e.g., see FIG. 21) with latch tips 55*e* and 56*e* aligned with slots 72 and 66 (see FIGS. 12 and 13), respectively. Thereafter, referring to FIG. 26, with valve 101 open, the two-way valve solenoid is energized to switch valve 102 thereby linking cylinders 55*d* and 56*d* through valves 101 and 104 to port 201 so that springs 55*c* and 56*c* force the hydraulic fluid from cylinders 55*b* and 56*b*, respectively and latches 55*a* and 56*a* and their corresponding tips are forced into locking positions engaging recesses 72 and 76, respectively.

Figure 27:
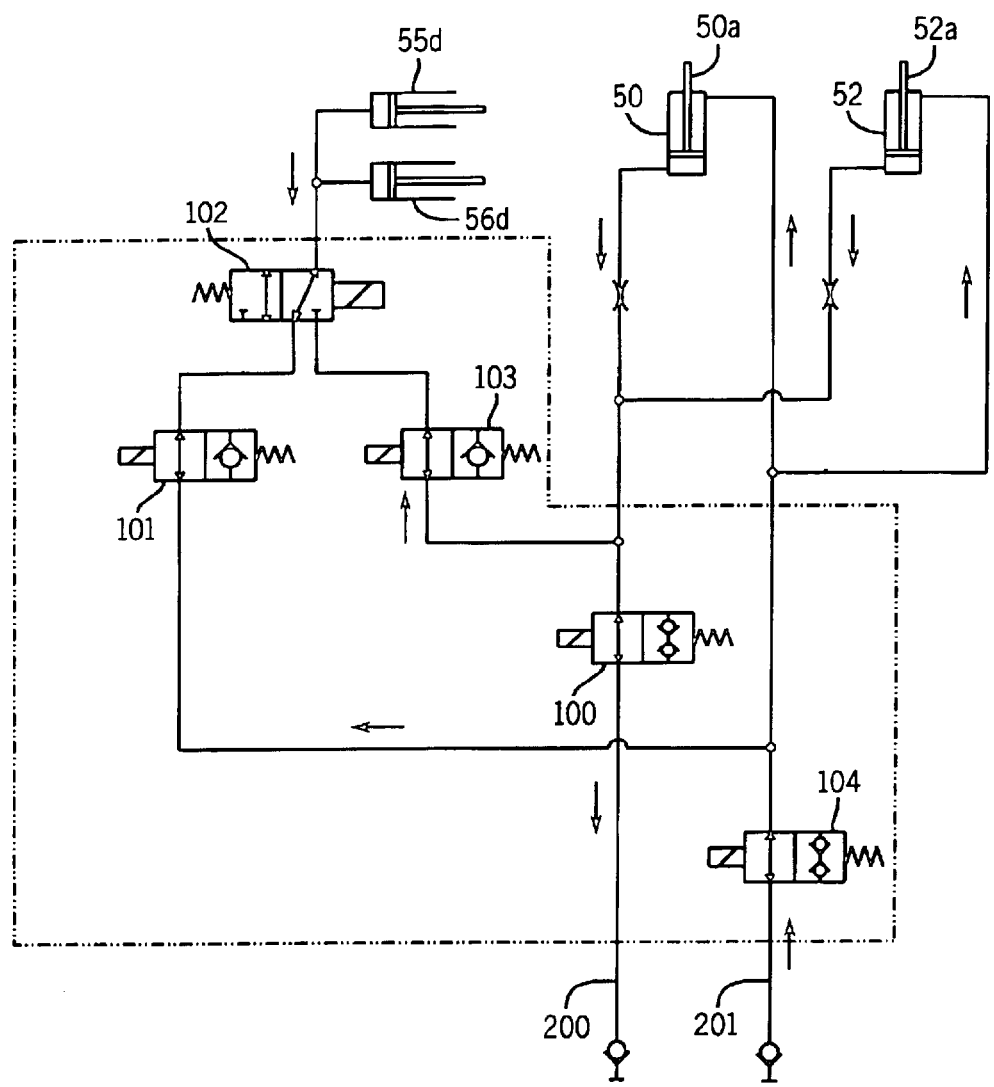
FIG. 27 is similar to FIG. 25, albeit at an instant in time when each of the latch cylinder rods is being driven toward the extended position and when each of the tongue cylinder rods is being driven toward the retracted position.
Figure 28:
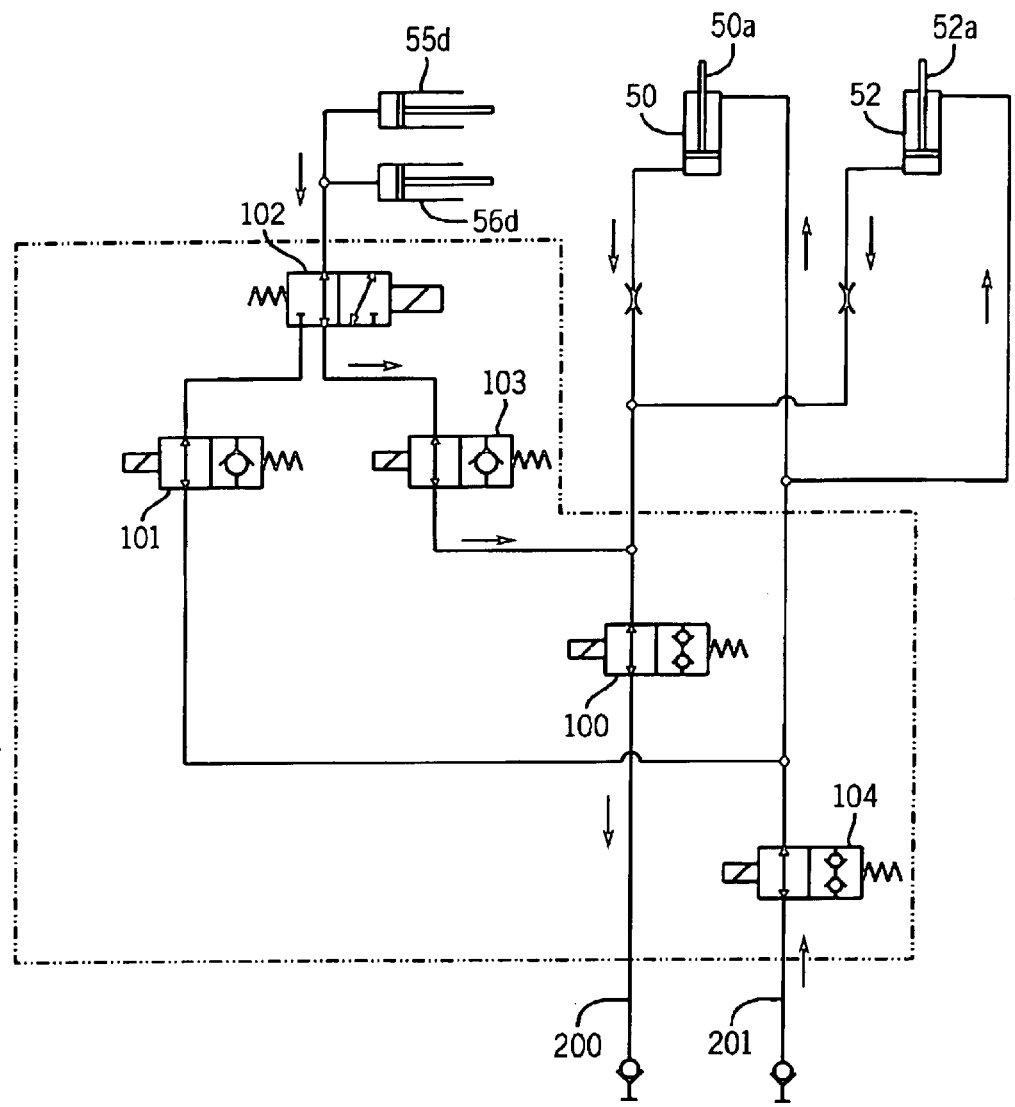
FIG. 28 is similar to FIG. 26, albeit at an instant in time when the tongue cylinder rods are being driven toward the retracted position and with the latch cylinder pressure released so that the latches are forced into locking positions.

Referring now to FIG. 27, to reverse the process described above, with valves 100, 101, 103 and 104 open and valve 102 linking cylinders 55*d* and 56*d* to valve 101, hydraulic fluid is pumped into the system via port 201. The fluid is provided through valves 104, 101 and 102 to cylinders 55*d* and 56*d* to, once again, drive the latches 55*a* and 56*a* into unlocked positions. Once cylinders 55*b* and 56*b* have topped off, fluid is provided to cylinders 50 and 52 thereby driving rods 50*a* and 52*a* toward retracted positions and thus causing tongue members 20 and 19 to retract into corresponding passageways. After the completely retracted positions have been achieved and tongue member ends 151 and 161 abut stop assemblies 74 and 65, respectively, referring to FIG. 28, the valve solenoid corresponding to valve 102 is energized to link cylinders 55*d* and 56*d* to open valve 103 thereby allowing the latch springs 55*c* and 56*c* to force liquid from valves 55*d* and 56*d* which exits port 200. Thus, the latch springs 55*c* and 56*c* again drive latch tips 55*e* into slots 73 and 67, respectively.

While the drawings, specific examples, and particular formations given describe exemplary embodiments, they serve the purpose of illustration only. The materials and configurations shown and described may differ depending on the chosen performance characteristics and physical characteristics of the planter equipment. For example, the type of planter equipment may differ. In addition, while a two stage configuration is illustrated, configurations including many more stages are contemplated where externally mounted cylinders are disposed on the various sides of the tongue assembly. Moreover, an embodiment where all cylinders are externally disposed is contemplated. Furthermore, other locking mechanisms are contemplated for use with the inventive apparatus.

In addition, while one wheel assembly 44 is described above, other functionally similar assemblies are contemplated that may include more than one wheel, may be differently adjustable, may be mounted to the other components differently and so on.

For instance, referring to FIG. 32, instead of having assembly 44 extend rearward from bar member 14, assembly 44 could extend from the other side of member 44. Thus, the systems shown and described are not limited to the precise details and conditions disclosed. Furthermore, other substitutions, modifications, changes, and omissions may be made in the design, operating conditions, and arrangement of the exemplary embodiments without departing from the spirit of the invention as expressed in the appended claims.

What is claimed is:

1. An apparatus for use with an agricultural assembly including a carrier frame including a support surface defining an arcuate track about a pivot point and a mainframe mounted to the carrier frame at the pivot point for rotation thereabout between an operating position and a transportation position, the apparatus comprising:

a wheel assembly including a mounting member, a wheel and at least one adjustment bolt, the mounting member mounted to the mainframe and the wheel linked to the mounting member via the adjustment bolt such that the wheel is received on the arcuate track for rotation there along, the adjustment bolt adjustable for modifying the relative vertical positions of the wheel and the mainframe to adjust the positions of the mainframe and the carrier frame.

2. The apparatus of claim 1 wherein the mounting member includes first and second plates linked to the mainframe and the adjustment bolt and wherein the wheel is mounted between the plates.

3. The apparatus of claim 2 wherein the mounting member further includes first and second block members linked to the mainframe and the plates, respectively, one of the block members forming a right threaded channel and the other of the block members forming a left threaded channel and, wherein, the adjustment bolt includes first and second ends that are right and left threaded, respectively, the adjustment bolt ends received in the block member channels.

4. The apparatus of claim 3 wherein the first end of the adjustment bolt is received in the first block member channel, the first block member includes a jamming surface facing the second blocking member, the apparatus further including a jam nut threadably received on the first end of the bolt such that the jam nut can be tightened against the jamming surface to lock the relative positions of the bolt and the first and second block members.

5. The apparatus of claim 3 wherein each of the first and second plates has proximal and distal ends and the wheel is mounted between the proximal and distal ends, the proximal ends are pivotally linked to the mainframe and the distal ends are pivotally linked to the second block member, wherein each plate is mounted to the mainframe, second block and wheel at first, second and third mounting points, respectively, that form a triangle, the third mounting point below at least one of the first and second mounting points.

6. An apparatus for use with an agricultural assembly including a carrier frame including a support surface defining an arcuate track about a pivot point and a mainframe mounted to the carrier frame at the pivot point for rotation thereabout between an operating position and a transportation position, the apparatus comprising:

first and second plates, each plate including proximal and distal ends and defining first, second and third mounting points, the proximal ends pivotally linked to the mainframe at the first mounting points;

a turnbuckle including first and second block members and a bolt, one of the block members forming a right threaded channel and the other of the block members forming a left threaded channel, the bolt including opposite first and second ends that are right threaded and left threaded, respectively, the bolt ends received within the channels, the first block member pivotally linked to the mainframe above the plates and the second block member pivotally linked to the plates at the second mounting points; and a wheel mounted between the plates at the third mounting points such that the wheel is received on the track.

7. The apparatus of claim 6 wherein the mounting points on each of the plates form a triangle and wherein each third mounting point is vertically below at least one of the first and second mounting points on the same plate.

8. The apparatus of claim 7 further including a bracket mounted to the mainframe wherein the proximal ends of the plates and the first block members are pivotally mounted to the bracket.

9. The apparatus of claim 8 wherein the bracket is proximate and extends toward the first end of the track when the mainframe is in the operating position.

* * * * *